US012780959B2

(12) United States Patent
Spencer et al.

(10) Patent No.: US 12,780,959 B2
(45) Date of Patent: Nov. 3, 2026

(54) OLEFIN/SILOXANE INTERPOLYMERS AND OLEFIN/CYCLIC SILANE INTERPOLYMERS

(71) Applicants: Dow Global Technologies LLC, Midland, MI (US); Dow Silicones Corporation, Midland, MI (US); Rohm and Haas Company, Collegeville, PA (US)

(72) Inventors: Liam P. Spencer, Lake Jackson, TX (US); Zachary S. Kean, Bay City, MI (US); David D. Devore, Midland, MI (US); Jordan C. Reddel, Midland, MI (US); Bethany M. Neilson, Manvel, TX (US); Matthew Olsen, Wilmington, DE (US); Zhanjie Li, Midland, MI (US); Phillip D. Hustad, Houston, TX (US)

(73) Assignees: Dow Global Technologies LLC, Midland, MI (US); Dow Silicones Corporation, Midland, MI (US); Rohm and Haas Company, Collegeville, PA (US)

( * ) Notice: Subject to any disclaimer, the term of this patent is extended or adjusted under 35 U.S.C. 154(b) by 647 days.

(21) Appl. No.: 18/013,232

(22) PCT Filed: Jun. 23, 2021

(86) PCT No.: PCT/US2021/038559

§ 371 (c)(1),
(2) Date: Dec. 27, 2022

(87) PCT Pub. No.: WO2021/262774

PCT Pub. Date: Dec. 30, 2021

(65) Prior Publication Data

US 2023/0265222 A1 Aug. 24, 2023

Related U.S. Application Data

(60) Provisional application No. 63/043,209, filed on Jun. 24, 2020.

(51) Int. Cl.

| | |
|---|---|
| ***C08F 8/42*** | (2006.01) |
| ***C08F 4/659*** | (2006.01) |
| ***C08F 210/02*** | (2006.01) |
| ***C08F 230/08*** | (2006.01) |
| ***C08G 77/442*** | (2006.01) |

(52) U.S. Cl.

CPC ............ *C08F 8/42* (2013.01); *C08F 4/65912* (2013.01); *C08F 210/02* (2013.01); *C08F 230/08* (2013.01); *C08G 77/442* (2013.01); *C08F 2420/02* (2013.01)

(58) Field of Classification Search

CPC ...... C08F 8/42; C08F 4/65912; C08F 210/02; C08F 230/08; C08F 2420/02; C08F 299/00; C08G 77/442

See application file for complete search history.

(56) References Cited

U.S. PATENT DOCUMENTS

| | | | |
|---|---|---|---|
| 3,223,686 A | 12/1965 | Spa | |
| 5,578,690 A | 11/1996 | Marks et al. | |
| 6,075,103 A | 6/2000 | Marks et al. | |
| 6,258,902 B1 | 7/2001 | Campbell, Jr. et al. | |
| 6,624,254 B1 | 9/2003 | Arriola et al. | |
| 9,000,108 B2 | 4/2015 | Klosin et al. | |
| 9,388,265 B2 | 7/2016 | Burns et al. | |
| 2012/0172545 A1* | 7/2012 | Demirors | C08F 283/12 525/479 |

(Continued)

FOREIGN PATENT DOCUMENTS

| | | |
|---|---|---|
| CN | 105175595 | 5/2017 |
| JP | S60206807 | 10/1985 |
| JP | S6456710 | 3/1989 |

(Continued)

OTHER PUBLICATIONS

Oishi (Oishi Motoi et al "Synthesis and Characterization of Optically Active Hyperbranched Paly(carbosiloxane)s", Macromolecules, vol. 35, No. 13, Jun. 1, 2002 (Jun. 1, 2002), pp. 4938-4945).*

(Continued)

*Primary Examiner* — Kumar R Bhushan

(57) ABSTRACT

An interpolymer, which comprises at least one siloxane group, and prepared by polymerizing a mixture comprising one or more "addition polymerizable monomers" and at least one siloxane monomer, in the presence of a catalyst system comprising a Group 3-10 metal complex, and the siloxane monomer is selected from the following Formula 1: $A_a$-$Si(B_b)(C_c)(H_{h0})$—O—$(Si(D_d)(E_e)\ (H_{h1})$—$O)_x$—$Si(F_f)(G_g)(H_{h2})$, described herein. An ethylene/siloxane interpolymer comprising at least one chemical unit of Structure 1, or at least one chemical unit of Structure 2, each described herein. A process to form an interpolymer, which comprises, in polymerized form, at least one siloxane monomer, or at least one silane monomer without a siloxane linkage, said process comprising polymerizing a mixture comprising one or more "addition polymerizable monomers" and at least one monomer of Formula 4, described herein, in the presence of a catalyst system comprising a metal complex from Formula A or Formula B, each described herein.

13 Claims, 5 Drawing Sheets

(56) References Cited

U.S. PATENT DOCUMENTS

2023/0099625 A1* 3/2023 Zhou .................... C07F 7/0874
556/450

FOREIGN PATENT DOCUMENTS

| | | | |
|---|---|---|---|
| JP | 2503527 | * | 6/1996 |
| JP | H11158232 | | 6/1999 |
| JP | 2003252881 | | 9/2003 |
| WO | 199500526 | | 1/1995 |
| WO | 01009207 | | 8/2001 |
| WO | 2010000478 | | 1/2010 |
| WO | 2010000479 | | 1/2010 |
| WO | 2019182720 | | 9/2019 |
| WO | 2021038561 | | 3/2021 |
| WO | 2021258328 | | 12/2021 |
| WO | 2021262775 | | 12/2021 |
| WO | 2021262776 | | 12/2021 |

OTHER PUBLICATIONS

Oishi Motoi et al: "Synthesis and Characterization of Optically Active Hyperbranched poly(carbosiloxane)," Macromolecules, vol. 35, No. 13, Jun. 1, 2002 (Jun. 1, 2002), pp. 4938-4945.*

Jin Zhen et al: "Synthesis of a novel type of octyltetramethyldisiloxane-containing olefinic macromonomer and its copolymerization with ethylene," Polymer, Elsevier Science Publishers B.V, GB, vol. 83, Dec 8, 2015 (Dec. 8, 2015), pp. 20-26.*

Tian Baozheng et al: "Synthesis of polyethylene-g-polydimethylsiloxane graft copolymers by copolymerization of ethylene with polydimethylsiloxane macromonomer," European Polymer Journal, Pergamon Press Ltd Oxford, GB, vol. 118, Jun. 14, 2019 (Jun. 14, 2019), pp. 578-585.*

Database WPI Week 201642 Thomson Scientific, London, GB; AN 2016-00336L XP002804289, -& CN 105 175 595 A (Univ Zhejiang) Dec. 23, 2015 (Dec. 23, 2015).*

Oishi, Synthesis and Characterization of Optically Active Hyperbranched Poly(carbosiloxane)s, Marcomolecules, 2002, vol. 35, No. 13, pp. 4938-4945.

Amin, "Alkenylsilane Effects on Organotitanium—Catalyzed Ethylene Polymerization. Toward Simultaneous Polyolefin Branch and Functional Group Introduction" 2006, vol. 128, p. 4506-4507.

Jin, "Synthesis of a novel type of octyltetramethyldisiloxane-containing olefinic macromonomer and its copolymerization with ethylene" 2016, vol. 83, p. 20-26.

Makio, "Silanolytic Chain Transfer in Olefin Polymerization with Supported Single-Site Ziegler-Natta Catalysts" 2001, vol. 34 p. 4676-4679.

Mathias, "Hyperbranched Poly(siloxysiloxanes)", 1991, vol. 113, p. 4043-4044.

Mathias, "Linear and Star-branched Siloxy-silane Polymers: One-pot A-B Polymerization and End-capping," 1992, p. 1-3.

Oishi, "Synthesis and Characterization of Optically Active Hyperbranched Poly(carbsiloxane)s", 2002, vol. 35, No. 13, p. 4938-4945.

SI-Link DFDA-5451 NT Technical Data Sheet, 2015, p. 1-3.

Tian, "Synthesis of polyethylene-g-polydimethylsiloxane graft copolymers by copolymerization of ethylene with bolydimethylsiloxane macromonomer" 2019, vol. 118, p. 578-585.

PCT/US2021/038559 International Search Report and Written Opinion with a mailing date of Oct. 7, 2021.

* cited by examiner

OLEFIN/SILOXANE INTERPOLYMERS AND OLEFIN/CYCLIC SILANE INTERPOLYMERS

CROSS-REFERENCE TO RELATED APPLICATIONS

The present application claims the benefit of priority to U.S. Provisional Application No. 63/043,209, filed on Jun. 24, 2020, which is incorporated herein by reference in its entirety.

BACKGROUND OF THE INVENTION

Silane-containing polymers have been synthesized, and can be modified, for example, via coupling, hydrolysis, alcoholysis, hydrolysis and neutralization, condensation, or oxidation. For example, U.S. Pat. No. 6,624,254 discloses the syntheses of silane functionalized polymers, and the conversions of these polymers (see abstract). See also, U.S. Pat. No. 6,258,902. Silyl-terminated polyolefins and/or silane functionalized polyolefins are disclosed in the following references: U.S. Pat. Nos. 6,075,103; 5,578,690; H. Makio et al., *Silanolytic Chain Transfer in Olefin Polymerization with Supported Single-Site Ziegler-Natta Catalysts*, Macromolecules, 2001, 34, 4676-4679; S. B. Amin et al., *Alkenylsilane Effects on Organotitanium-Catalyzed Ethylene Polymerization Toward Simultaneous Polyolefin Branch and Functional Group Introduction*, J. Am. Chem. Soc., 2006, 128, 4506-4507.

Linear and hyperbranched poly(siloxysilanes) have been polymerized using a Pt-catalyzed hydrosilylation, condensation polymerization. A-B type monomers that possesses an alkene moiety and silane moieties have been used to prepare siloxy-silane polymers. See Mathias et al., *Linear and Star-Branched Siloxy-Silane Polymers: One-Pot A-B Polymerization and End-Capping*, May 29, 1992, Naval Research Office report available at http://www.dtic.mil/dtic/tr/fulltext/u2/a252195.pdf; and Mathias et al., *Hyperbranched Poly(siloxysiloxanes)*, J. Am. Chem. Soc., 1991, 113, 4043-4044.

U.S. Pat. No. 3,223,686 discloses the polymerization of vinyl-silane monomers, for example, $(R)Si(R1)(H)-(CH_2)_n-CH{=}CH_2$, where R and R1 are hydrogen or a lower alkyl group (see column 1, lines 58-66). The vinyl monomers can be copolymerized with other unsaturated hydrocarbons, including olefins (see column 4, lines 33-36). U.S. Pat. No. 9,388,265 discloses a method for producing silyl-functionalized polyolefin, by reacting a silicon-containing olefin with an alpha-olefin, in the presence of a catalytic amount of a group IV catalyst (see abstract). Silicon-containing olefins include those represented by "$R''CH-CH-(Z)_m-(CH_2)_n-SiR_aR'_{(3-a)}$," where Z is an electron withdrawing moiety, m is 0 or 1, n is from 0 to 30, R is an alkoxy group or an amine group, a is from 1 to 3, R' is an hydrocarbyl group, and R" is H or a group having an electron withdrawing effect as described therein (see claim 1). The unsaturated silane can be partially hydrolyzed and condensed to form oligomers with siloxane linkage, with reference to WO2010/000478 and WO2010/000479, which disclose the hydrolysis of preferred hydrolyzable groups, such as alkoxy, acyloxy, ketoxime, alkyllactato, amino, amido, aminoxy or alkenyloxy (see column 4, lines 45-49, of U.S.'265, and, for example, WO2010/000479 (paragraph [0018]).

It is widely accepted that the presence of an oxygen atom adjacent to a Si atom, in an "—Si—H" group of a silane monomer, for example an "—Si—O—Si—H" moiety, can inhibit the catalyst efficiency during an addition polymerization of the monomer, via transition metal catalyst systems of the noted art. However, it has been discovered that siloxane monomers containing an "—Si—O—Si—H" moiety can be effectively copolymerized with olefin monomers, such as ethylene, and such polymerizations have high catalyst efficiencies (for example, >150,000 g polymer/g catalyst). Also, it has been discovered that there is an enhanced reactivity of the "—Si—H" moiety when this moiety is attached to an oxygen atom in an "—Si—O—Si—H" moiety.

It has also been discovered that monomers containing both a cyclic alkenyl moiety, such as a norbornenyl moiety, and an "—Si(R1)(R2)(H)" moiety, where R1 and R2 are, independently, hydrogen or a hydrocarbyl group, and where the Si atom is attached to either a carbon atom or an oxygen atom, readily copolymerize with an olefin. These polymerizations also have high catalyst efficiencies.

JP2003252881A discloses silylnorbornene and silyltetracyclododecene compounds, each containing a "—C(R1)(R2)-Si(X1)(X2)(X3)" moiety, and where one X is a $C_{1-4}$ alkoxy or a halogen, and the remaining Xs are $C_{1-4}$ alkyl or H (see abstract from machine translation). See also, the prior art discussion above. However, as discussed, it has been discovered that siloxane monomers containing an "—Si—O—Si—H" moiety can readily copolymerized with an olefin, while maintain excellent catalyst efficiency. Also, silane monomers containing a cyclic alkenyl moiety and an "Si(R1)(R2)(H)" moiety, where R1 and R2 are, independently, hydrogen or a hydrocarbyl group, and where the Si atom is attached to either a carbon atom or an oxygen atom, also readily copolymerize with an olefin, with excellent catalyst efficiency.

SUMMARY OF THE INVENTION

An interpolymer, which comprises at least one siloxane group, said interpolymer prepared by polymerizing a mixture comprising one or more "addition polymerizable monomers" and at least one siloxane monomer, in the presence of a catalyst system comprising a Group 3-10 metal complex, and wherein the siloxane monomer is selected from the following Formula 1:

$$A_a\text{-}Si(B_b)(C_c)(H_{h0})-O-(Si(D_d)(E_e)(H_{h1})-O)_x-Si(F_f)(Gg)(H_{h2}) \quad \text{(Formula 1)},$$

where A is an alkenyl group, H is hydrogen;

B is a hydrocarbyl group, C is a hydrocarbyl group, and B and C may be the same or different;

a=1 or 2, b=0, 1 or 2, c=0, 1 or 2, h0=0, 1 or 2, a+b+c+h0=3;

D is a hydrocarbyl group, E is a hydrocarbyl group, and D and E may be the same or different, and where D may be the same or different across the number of x units, and where E may be the same or different across the number of x units;

d=0, 1 or 2, e=0, 1 or 2, h1=0, 1 or 2, d+e+h1=2, x≥0;

F is a hydrocarbyl group, G is a hydrocarbyl group, and F and G may be the same or different;

f=0, 1 or 2, g=0, 1 or 2, h2=1 or 2, f+g+h2=3.

An ethylene/siloxane interpolymer comprising at least one chemical unit of Structure 1 or at least one chemical unit of Structure 2, each as shown below:

(Structure 1)

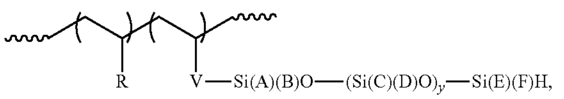

wherein y≥0; H is hydrogen; R is hydrogen or an alkyl; V is a hydrocarbylene group;

A is a hydrocarbyl group or hydrogen, B is a hydrocarbyl group or hydrogen, and A and B may be the same or different;

C is a hydrocarbyl group or hydrogen, D is a hydrocarbyl group or hydrogen, and C and D may be the same or different, and where C may be the same or different across the number of y units, and where D may be the same or different across the number of y units;

E is a hydrocarbyl group or hydrogen, F is a hydrocarbyl group or hydrogen, and E and F may be the same or different;

(Structure 2)

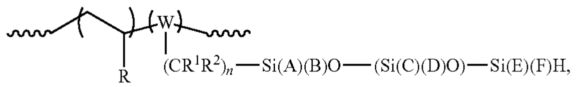

wherein y≥0; and n≥1; H is hydrogen; R is hydrogen or an alkyl; —W— is a -(cyclic)- group;

each of $R^1$ and $R^2$ is independently hydrogen or a hydrocarbyl group, and $R^1$ and $R^2$ may be the same or different;

A is a hydrocarbyl group or hydrogen, B is a hydrocarbyl group or hydrogen, and A and B may be the same or different;

C is a hydrocarbyl group or hydrogen, D is a hydrocarbyl group or hydrogen, and C and D may be the same or different, and where C may be the same or different across the number of y units, and where D may be the same or different across the number of y units;

E is a hydrocarbyl group or hydrogen, F is a hydrocarbyl group or hydrogen, and E and F may be the same or different.

A process to form an interpolymer, which comprises, in polymerized form, at least one siloxane monomer, or at least one silane monomer without a siloxane linkage, said process comprising polymerizing a mixture comprising one or more "addition polymerizable monomers" and at least one monomer of Formula 4, in the presence of a catalyst system comprising a metal complex selected from Formula A or Formula B, and wherein Formula 4 is as follows:

$$A_a\text{-}(Si(B_b)(C_c)(H_{h0})\text{—}O)_x\text{—}(Si(D_d)(E_e)(H_{h1})\text{—}O)_y\text{—}Si(F_f)(G_g)(H_{h2}) \quad \text{(Formula 4)},$$

where A is an alkenyl group, H is hydrogen;

B is a hydrocarbyl group, C is a hydrocarbyl group, and where B and C may be the same or different, and where B may be the same or different across the number of x units, and where C may be the same or different across the number of x units;

D is a hydrocarbyl group, E is a hydrocarbyl group, and where D and E may be the same or different, and where D may be the same or different across the number of y units, and where E may be the same or different across the number of y units;

F is a hydrocarbyl group, G is a hydrocarbyl group, and where F and G may be the same or different;

x=0 or 1, and when x=0, then y=0, and a=1 or 2, h2=1, or 2, f=0, 1 or 2, g=0, 1 or 2, and a+f+g+h2=4;

when x=1, then y≥0, and a=1 or 2, b=0, 1 or 2, c=0, 1 or 2, h0=0, 1 or 2, d=0, 1 or 2, e=0, 1 or 2, h1=0, 1 or 2, f=0, 1 or 2, g=0, 1 or 2, h2=1 or 2, and a+b+c+h0=3, d+e+h1=2, and f+g+h2=3; and wherein Formula A is as follows:

(Formula A)

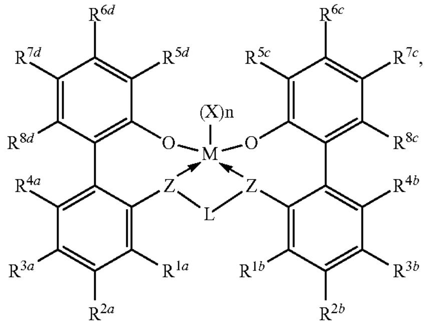

wherein:

M is titanium, zirconium, or hafnium, each independently being in a formal oxidation state of +2, +3, or +4, n is an integer of from 0 to 3, and when n is 0, X is absent;

each X, independently, is a monodentate ligand that is neutral, monoanionic, or dianionic; or two X are taken together to form a bidentate ligand that is neutral, monoanionic, or dianionic;

X and n are chosen in such a way that the metal-ligand complex of Formula A is, overall neutral;

each Z, independently, is O, S, N-hydrocarbyl, or P-hydrocarbyl;

L is hydrocarbylene or heterohydrocarbylene, wherein the hydrocarbylene has a portion that comprises a "1-carbon atom to 6-carbon atom" linker backbone, linking the Z atoms in Formula A, and the heterohydrocarbylene has a portion that comprises a "1-atom to 6-atom" linker backbone, linking the Z atoms in Formula A, wherein each atom of the "1-atom to 6-atom" linker backbone of the heterohydrocarbylene, independently, is a carbon atom or a heteroatom, and wherein each heteroatom, independently, is O, S, S(O), $S(O)_2$, $Si(R^C)_2$, $Ge(R^C)_2$, $P(R^P)$, or $N(R^N)$, wherein, independently, each $R^C$ is an unsubstituted (C1-C18)hydrocarbyl, or the two $R^C$ are taken together to form a (C2-C19)alkylene, each $R^P$ is an unsubstituted (C1-C18) hydrocarbyl; and each $R^N$ is an unsubstituted (C1-C18) hydrocarbyl, a hydrogen atom, or is absent;

each of $R^{1a}$, $R^{2a}$, $R^{1b}$, and $R^{2b}$, independently, is a hydrogen atom, a hydrocarbyl, a heterohydrocarbyl, or a halogen atom;

each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$, independently, is a hydrogen atom, a hydrocarbyl, a heterohydrocarbyl, or a halogen atom;

each of $R^{5c}$ and $R^{5d}$, independently, is an aryl or a heteroaryl, and where the aryl may comprise one or more alkyl groups, and where the heteroaryl may comprise one or more alkyl groups;

each of the aforementioned aryl, heteroaryl, hydrocarbyl, heterohydrocarbyl, hydrocarbylene, and heterohydrocarbylene groups, independently, is unsubstituted or substituted with one or more substituents $R^S$; and each $R^S$, independently, is a halogen atom, a polyfluoro substituted, a perfluoro substituted, $F_3C$—; $FCH_2O$—; $F_2HCO$—; $F_3CO$—; $R_3Si$—; $R_3Ge$—; RO—; RS—; RS(O)—; $RS(O)_2$—; $R_2P$—; $R_2N$—; $R_2C{=}N$—; NC—; RC(O)O—; ROC(O)—; RC(O)N(R)—; or $R_2NC(O)$—; or two of the $R^S$ taken together to form an unsubstituted (C1-C18)alkylene, and where each $R^S$ is derived from an alkyl; and wherein each R, independently, is an unsubstituted (C1-C18)alkyl; and wherein Formula B is as follows:

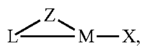

(Formula B)

wherein

M is titanium or zirconium in the +2 formal oxidation state,

L is a group containing a cyclic, delocalized, anionic, π-system through which the group is bound to M, and which group is also bound to Z;

Z is a moiety bound to M via a σ-bond, comprising boron, or a member of Group 14 of the Periodic Table of the Elements, and also comprising nitrogen, phosphorus, sulfur or oxygen, said moiety having up to 60 non-hydrogen atoms; and X is a neutral, conjugated or nonconjugated diene, optionally substituted with one or more hydrocarbyl groups, said X having up to 40 carbon atoms and forming a π-complex with M.

An ethylene/silane interpolymer comprising at least one chemical unit of Structure 3 as shown below:

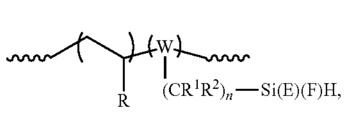

(Structure 3)

wherein n≥1; H is hydrogen; R is hydrogen or an alkyl; —W— is a -(cyclic)- group;

each of $R^1$ and $R^2$ is independently hydrogen or a hydrocarbyl group, and $R^1$ and $R^2$ may be the same or different;

E is a hydrocarbyl group or hydrogen, F is a hydrocarbyl group or hydrogen, and E and F may be the same or different.

DETAILED DESCRIPTION OF THE INVENTION

Figure 1:
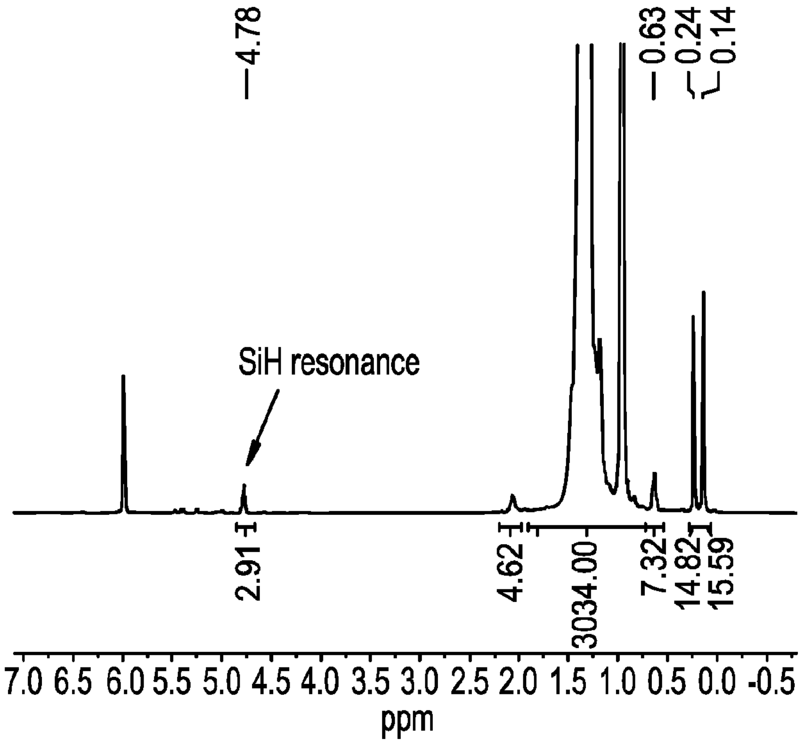
FIG. 1 depicts the 1H NMR spectrum of an ethylene-co-1-octene-co-1-(hex-5-en-1-yl)-1,1,3,3-tetramethyldisiloxane terpolymer with vinylpentamethyldisiloxane, before functionalization with the vinylpentamethyldisiloxane

It has been discovered that siloxane monomers containing an "—Si—O—Si—H" moiety can readily copolymerized with an olefin, while maintaining excellent catalyst efficiency. These olefin/siloxane interpolymers have enhanced reactivity toward various functionalization, have uniform silane distribution, and tunable Si incorporation.

Also, it has been discovered that monomers containing both a cyclic alkenyl moiety and an "—Si(R1)(R2)(H)" moiety, where R1 and R2 are, independently, hydrogen or a hydrocarbyl group, and where the Si atom is attached to either a carbon atom or an oxygen atom, readily copolymerize with an olefin, with excellent catalyst efficiency. These olefin/cyclic silane interpolymers have uniform silane distribution, tunable Si incorporation, and can undergo further functionalization chemistry.

Thus, in a first aspect of the invention, an interpolymer is provided, and which comprises at least one siloxane group, said interpolymer prepared by polymerizing a mixture comprising one or more "addition polymerizable monomers" and at least one siloxane monomer, in the presence of a catalyst system comprising a Group 3-10 metal complex, and wherein the siloxane monomer is selected from Formula 1, as described herein. The interpolymer may comprise a combination of two or more embodiments, as described herein. Formula 1 may comprise a combination of two or more embodiments, as described herein.

As used herein, the phrase "at least one siloxane group," in reference to an inter-polymer, refers to a type of siloxane group. It is understood in the art that the interpolymer would contain a multiple number of such siloxane type.

In one embodiment, or a combination of two or more embodiments, each described herein, the interpolymer is an olefin/siloxane interpolymer, and further an ethylene/siloxane interpolymer.

In one embodiment, or a combination of two or more embodiments, each described herein, for Formula 1, D is a hydrocarbyl group, E is a hydrocarbon group, and where D and E may be the same or different, and where D is the same across the number of x units, and where E is the same across the number of x units.

In one embodiment, or a combination of two or more embodiments, each described herein, for Formula 1, A is selected from the following structures i)-iv):

i) $R^1R^2C{=}CR^3$—, where each of $R^1$, $R^2$, $R^3$ is independently hydrogen, an alkyl group, or an aryl group, and wherein two or more from $R^1$, $R^2$, $R^3$ may be the same or different;

ii) $R^1R^2C{=}CR^3$—$(CR^4R^5)_n$—, where each of $R^1$, $R^2$, $R^3$, $R^4$, $R^5$ is independently hydrogen, an alkyl group, or an aryl group, and two or more from $R^1$, $R^2$, $R^3$, $R^4$, $R^5$ may be the same or different, and n≥1;

iii)

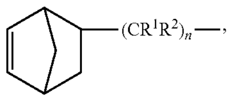

where each of $R^1$ and $R^2$ is independently hydrogen, an alkyl group, or an aryl group, and wherein $R^1$, and $R^2$ may be the same or different, and n≥1; or iv)

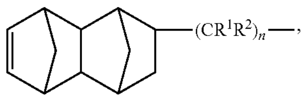

where each of $R^1$ and $R^2$ is independently hydrogen, an alkyl group, or an aryl group, and wherein $R^1$, and $R^2$ may be the same or different, and n≥1.

Note, as used herein, R1=$R^1$, R2=$R^2$, R3=$R^3$, and so forth. Also, the notation $R^a$—$R^n$, where "a through n" represents consecutive numbers, refers to $R^a$, $R^{a+1}$, $R^{a+2}$, . . . , $R^n$. For example, $R^3$-$R^7$ refers to $R^3$, $R^4$, $R^5$, $R^6$, $R^7$.

In one embodiment, or a combination of two or more embodiments, each described herein, for Formula 1, a=1, b=1, c=1, h0=0; d=1, e=1, $h_1$=0; and f=1, g=1, $h_2$=1.

In one embodiment, or a combination of two or more embodiments, each described herein, the interpolymer comprises, in polymerized form, ≥0.10 wt %, or ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of the siloxane monomer, based on the weight of the interpolymer. In one embodiment, or a combination of two or more embodiments, each described herein, the interpolymer comprises, in polymerized form, ≤10 wt %, or ≤9.0 wt %, or ≤8.0 wt %, or ≤7.0 wt %, or ≤6.0 wt %, or ≤5.0 wt %, or ≤4.8 wt %, or ≤4.6 wt %, or ≤4.4 wt %, or ≤4.2 wt %, or ≤4.0 wt % of the siloxane monomer, based on the weight of the interpolymer.

In one embodiment, or a combination of two or more embodiments, each described herein, Formula 1 is selected from the following compounds s1) through s8) below:

(s1)

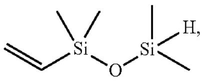

(s2)

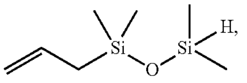

(s3)

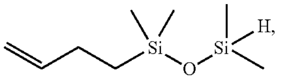

(s4)

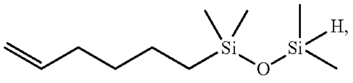

(s5)

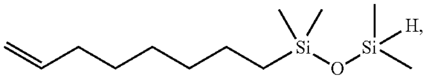

(s6)

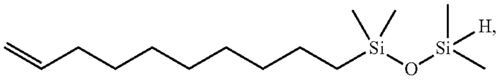

(s7)

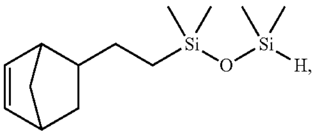

or (s8)

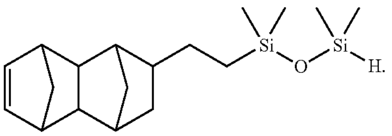

In one embodiment, or a combination of two or more embodiments, each described herein, the one or more "addition polymerizable monomers" comprise ethylene and/or an alpha-olefin, and further ethylene and an alpha-olefin. Further the alpha-olefin is a C3-C20 alpha-olefin, further a C3-C10 alpha-olefin, further propylene, 1-butene, 1-hexene or 1-octene, further propylene, 1-butene or 1-octene, further 1-butene or 1-octene, further 1-octene.

In a second aspect of the invention, an ethylene/siloxane interpolymer is provided, and which comprises, at least one chemical unit of Structure 1, as described herein, or at least one chemical unit of Structure 2, as described herein. The interpolymer may comprise a combination of two or more embodiments, as described herein. Structure 1 may comprise a combination of two or more embodiments, as described herein. Structure 2 may comprise a combination of two or more embodiments, as described herein.

As used herein, the phrase "at least chemical unit of Structure 1," or at least chemical unit of Structure 2," in reference to an ethylene/siloxane interpolymer, refers to a type of the respective chemical unit. It is understood in the art that the interpolymer would contain a multiple number of such unit type. Also, as used herein, in reference to Structure 1 or Structure 2, the notation "∿∿" refers to the point of attachment of the respective structure to the remaining portion of the ethylene/siloxane interpolymer on the respective side of the structure.

In one embodiment, or a combination of two or more embodiments, each described herein, for Structure 1, C is a hydrocarbyl group or hydrogen, D is a hydrocarbyl group or hydrogen, and C and D may be the same or different, and where C is the same across the number of y units, and where D is the same across the number of y units.

In one embodiment, or a combination of two or more embodiments, each described herein, for Structure 1, V is an alkylene group.

In one embodiment, or a combination of two or more embodiments, each described herein, for Structure 1, V is selected from —$(CR^1R^2)_x$—, wherein each of $R^1$ and $R^2$ is independently hydrogen, an alkyl group, or an aryl group, further hydrogen or an alkyl group; and wherein $R^1$ and $R^2$ may be the same or different; and x≥1, further x is from 1 to 10, or 1 to 8, or 1 to 6, or 1 to 4, or 1 to 2, or 1.

In one embodiment, or a combination of two or more embodiments, each described herein, for Structure 2, C is a hydrocarbyl group or hydrogen, D is a hydrocarbyl group or hydrogen, and C and D may be the same or different, and where C is the same across the number of y units, and where D is the same across the number of y units.

In one embodiment, or a combination of two or more embodiments, each described herein, for Structure 2, —W— is a -(bicyclic)- group, and further a -(bridged bicyclic)- group.

In one embodiment, or a combination of two or more embodiments, each described herein, for Structure 2, —W— is selected from structures w1 and w2 below. Note, for each structure the notation "∿∿∿" refers to the point of attachment of the structure to the "—$(CR^1R^2)_n$" of the remaining portion of the Structure 2 (described herein).

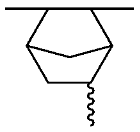

(w1)

or

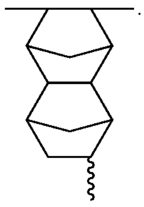

(w2)

In one embodiment, or a combination of two or more embodiments, each described herein, Structure 2 is selected from Structure 2b, as described herein, or Structure 2b' as described herein. See, for example, "Listing of Some Interpolymers and Processes" section.

In one embodiment, or a combination of two or more embodiments, each described herein, the ethylene/siloxane interpolymer further comprises, in polymerize form, an alpha-olefin, and further a C3-C20 alpha-olefin, further a C3-C10 alpha-olefin, further propylene, 1-butene, 1-hexene or 1-octene, further propylene, 1-butene or 1-octene, further 1-butene or 1-octene, further 1-octene.

In one embodiment, or a combination of two or more embodiments, each described herein, the polymerized siloxane monomer portion of each of Structure 1 or Structure 2 is derived from a respective siloxane monomer, and wherein the interpolymer comprises, in polymerize form, ≥0.10 wt %, or ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of the siloxane monomer, based on the weight of the interpolymer.

In one embodiment, or a combination of two or more embodiments, each described herein, the polymerized siloxane monomer portion of each of Structure 1 or Structure 2 is derived from a respective siloxane monomer, and wherein the interpolymer comprises, in polymerize form, ≤10 wt %, or ≤9.0 wt %, or ≤8.0 wt %, or ≤7.0 wt %, or ≤6.0 wt %, or ≤5.0 wt %, or ≤4.8 wt %, or ≤4.6 wt %, or ≤4.4 wt %, or ≤4.2 wt %, or ≤4.0 wt % of the siloxane monomer, based on the weight of the interpolymer.

The following embodiments apply to both the first aspect and the second aspect of the invention.

Also is provided is a derivative of the interpolymer of one or two or more embodiments, described herein, and where the derivative is formed by one or more subsequent siloxane conversion processes selected from the group consisting of a)-e) below:

a) coupling of one or more chains of the interpolymer;
b) hydrolysis, alcoholysis, oxidation, or aminolysis to give Si—$OR^4$ or Si—$NR^4_2$ groups, where $R^4$ is H or a $C_1$_$C_{10}$ hydrocarbyl;
c) hydrolysis and neutralization to give ionomers having Si—$OR^6$ groups, where $R^6$ is a metal cation;
d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups; and
e) modification through hydrosilylation or a Piers Rubinsztajn reaction.

Also is provided a composition comprising the interpolymer of one or more embodiments, described herein, and at least one additive.

Also is provided a composition comprising the derivative interpolymer of one or more embodiments, described herein, and at least one additive.

As discussed, an inventive composition may comprise one or more additives. Additives include, but are not limited to, UV stabilizer, antioxidants, fillers, scorch retardants, tackifiers, waxes, compatibilizers, adhesion promoters, plasticizers (for example, oils), blocking agents, antiblocking agents, anti-static agents, release agents, anti-cling additives, colorants, dyes, pigments, and combination thereof.

Also provided is an article comprising at least one component formed from the composition of any one embodiment, or a combination of two or more embodiments, each described herein.

In a third aspect of the invention, is provided a process to form an interpolymer, which comprises, in polymerized form, at least one siloxane monomer, or at least one silane monomer without a siloxane linkage, said process comprising polymerizing a mixture comprising one or more "addition polymerizable monomers" and at least one monomer of Formula 4, as described herein, in the presence of a catalyst system comprising a metal complex selected from Formula A or Formula B, each as described herein. The process may comprise a combination of two or more embodiments, as described herein. Formula 4 may comprise a combination of two or more embodiments, as described herein. Formula A may comprise a combination of two or more embodiments, as described herein. Formula B may comprise a combination of two or more embodiments, as described herein.

As used herein, the phrase "at least one," in reference to a siloxane monomer or a silane monomer, refers to the type of monomer (siloxane or silane). It is understood in the art that the interpolymer would contain, in polymerized form, a multiple number of the respective monomer type.

In one embodiment, or a combination of two or more embodiments, each described herein, the mixture further comprises a scavenger, and a Bronsted acid or a Lewis acid, and further a scavenger and a Bronsted acid.

In one embodiment, or a combination of two or more embodiments, each described herein, for Formula 4, B is a hydrocarbyl group, C is a hydrocarbyl group, and where B and C may be the same or different, and where B is the same across the number of x units, and where C is the same across the number of x units.

In one embodiment, or a combination of two or more embodiments, each described herein, for Formula 4, D is a hydrocarbyl group, E is a hydrocarbyl group, and where D and E may be the same or different, and where D is the same across the number of y units, and where E is the same across the number of y units.

In one embodiment, or a combination of two or more embodiments, each described herein, the one or more "addition polymerizable monomers" comprise ethylene and an alpha-olefin. Further the alpha-olefin is a C3-C20 alpha-olefin, further a C3-C10 alpha-olefin, further propylene, 1-butene, 1-hexene or 1-octene, further propylene, 1-butene or 1-octene, further 1-butene or 1-octene, further 1-octene.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "olefin-based interpolymer," as used herein, refers to an interpolymer that comprises, in polymerized form, 50 wt % or a majority weight percent of an olefin, such as ethylene or propylene (based on the weight of the interpolymer), and one or more comonomers.

The term "ethylene-based interpolymer," as used herein, refers to an interpolymer that comprises, in polymerized form, 50 wt % or a majority weight percent of ethylene (based on the weight of the interpolymer), and one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority weight percent of ethylene (based on the weight of the copolymer), and an alpha-olefin, as the only two monomer types.

The term "siloxane group," and similar terms, as used herein, refer to a chemical group or moiety comprising at least one "—Si—O—Si—" (siloxane) linkage. The siloxane group is derived from a siloxane monomer that comprises an "—Si—H" moiety.

The term "siloxane monomer," as used herein, refers to a chemical compound comprising at least one carbon-carbon (C═C) double bond and at least one "—Si—O—Si—" (siloxane) linkage. As used herein, the siloxane monomer comprises an "—Si—H" moiety. See, for example, Formula 1 and Formula 2, each described herein.

The term "silane group," and similar terms, as used herein, refer to a chemical group or moiety comprising at least one "—Si—H" moiety. The silane group is derived from a silane monomer that may or may not comprise one or more siloxane (—Si—O—Si—) linkages.

The term "silane monomer," as used herein, refers to a chemical compound comprising at least one carbon-carbon (C═C) double bond and at least one "—Si—H" moiety. A silane monomer may or may not comprise one or more siloxane (—Si—O—Si—) linkages. See, for example, Formula 1 and Formula 3, each described herein.

The term "cyclic silane group," and similar terms, as used herein, refer to a chemical group or moiety comprising at least one "-(cyclic)-" moiety and at least one "—Si—H" moiety. The "-(cyclic)-" moiety is derived from a cyclic alkenyl moiety. The cyclic silane group is derived from a cyclic silane monomer that may or may not comprise one or more siloxane (—Si—O—Si—) linkages.

The term "cyclic silane monomer," as used herein, refers to a chemical compound comprising at least one cyclic alkenyl moiety, at least one "—Si—H" moiety. A cyclic silane monomer may or may not comprise one or more siloxane (—Si—O—Si—) linkages. The terms "bicyclic silane monomer" and "bridged bicyclic silane monomer" are similarly described. See, for example, Formula 3, and structures (s7) and (s8) of Formula 1, each described herein.

The term "alkenyl group," and similar terms, as used herein, refer to a chemical group that comprises at least one carbon-carbon double bond (C═C). In a preferred embodiment, the alkenyl group is a hydrocarbon group comprising at least one carbon-carbon double bond, and further comprising only one carbon-carbon double bond.

The term "cyclic alkenyl group," and similar terms, as used herein, refer to a chemical group that comprises at least one cyclic structure and at least one carbon-carbon double bond (C═C), located within the cyclic structure, and where this bond can undergo an addition polymerization with one or more addition polymerizable monomers. In a preferred embodiment, the cyclic alkenyl group is a hydrocarbon group comprising at least one carbon-carbon double bond, and further comprising only one carbon-carbon double bond.

The term "bicyclic alkenyl group," and similar terms, as used herein, refer to a chemical group that comprises two joined cyclic structures and at least one carbon-carbon double bond (C═C), located within the joined cyclic structure, and where this bond can undergo an addition polymerization with one or more addition polymerizable monomers. In a bridged bicyclic alkenyl group, the two cyclic structures share three or more atoms. The bridge head atoms are separated by a bridge comprising at least one atom. In a preferred embodiment, the bicyclic alkenyl group, and further the bridged bicyclic alkenyl group, is a hydrocarbon group comprising at least one carbon-carbon double bond, and further comprising only one carbon-carbon double bond.

The notation "-(cyclic)- group," as used herein, refers to a chemical group that comprises a cyclic structure. The divalent bonds, as shown, generate from adjacent atoms within the cyclic structure.

The notation "-(bicyclic)- group," as used herein, refers to a chemical group that comprises two joined cyclic structures. The divalent bonds, as shown, generate from adjacent atoms within the bicyclic structure.

The notation "-(bridged bicyclic)- group," as used herein, refers to a chemical group that comprises two joined cyclic structures, and where the two cyclic structures share three or more atoms. The bridge head atoms are separated by a bridge comprising at least one atom.

The divalent bonds, as shown, generate from adjacent atoms within the bridged bicyclic structure.

The term "olefin/siloxane interpolymer," as used herein, refers to a random inter-polymer that comprises, in polymerized form, 50 wt % or a majority weight percent of an olefin (based on the weight of the interpolymer), and a siloxane monomer. As used herein, the interpolymer comprises at least one siloxane group, and the phrase "at least one siloxane group" refers to a type of siloxane group. It is understood in the art that the interpolymer would contain a multiple number of this siloxane type. The olefin/siloxane interpolymer is formed by the copolymerization (for example, using a bis-biphenyl-phenoxy metal complex) of at least the olefin and the siloxane monomer. As used herein, the siloxane monomer comprises an "—Si—H" moiety. An example of a siloxane monomer is depicted in Formula 1 or Formula 2, each as described herein.

The term "ethylene/siloxane interpolymer," as used herein, refers to a random interpolymer that comprises, in polymerized form, 50 wt % or a majority weight percent of ethylene (based on the weight of the interpolymer), and a siloxane monomer. As used herein, the interpolymer comprises at least one siloxane group, as discussed above. The ethylene/-siloxane interpolymer is formed by the copolymerization of at least the ethylene and the siloxane monomer. The siloxane monomer comprises an "—Si—H" moiety.

The term "ethylene/siloxane copolymer," as used herein, refers to a random copolymer that comprises, in polymerized form, 50 wt % or a majority weight percent of ethylene (based on the weight of the copolymer), and a siloxane monomer, as the only two monomer types. As used herein, the copolymer comprises at least one siloxane group, as discussed above. The ethylene/siloxane copolymer is formed by the copolymerization of the ethylene and the siloxane monomer. The siloxane monomer comprises an "—Si—H" moiety.

The term "ethylene/alpha-olefin/siloxane interpolymer," as used herein, refers to a random interpolymer that comprises, in polymerized form, 50 wt % or a majority weight percent of ethylene (based on the weight of the interpolymer), an alpha-olefin and a siloxane monomer. As used herein, the interpolymer comprises at least one siloxane group, as discussed above. The ethylene/siloxane interpolymer is formed by the copolymerization of at least the ethylene, the alpha-olefin and the siloxane monomer. The siloxane monomer comprises an "—Si—H" moiety.

The term "ethylene/alpha-olefin/siloxane terpolymer," as used herein, refers to a random terpolymer that comprises, in polymerized form, 50 wt % or a majority weight percent of ethylene (based on the weight of the terpolymer), an alpha-olefin and a siloxane monomer as the only three monomer types. As used herein, the terpolymer comprises at least one siloxane group, as discussed above. The ethylene/siloxane terpolymer is formed by the copolymerization of the ethylene, the alpha-olefin and the siloxane monomer. The siloxane monomer comprises an "—Si—H" moiety.

The term "olefin/silane interpolymer," as used herein, refers to a random interpolymer that comprises, in polymerized form, 50 wt % or a majority weight percent of an olefin (based on the weight of the interpolymer), and a silane monomer. As used herein, the interpolymer comprises at least one "—Si—H group," and the phrase "at least one "—Si—H" group" refers to a type of "Si—H" group. It is understood in the art that the interpolymer would contain a multiple number of this silane type. The olefin/silane interpolymer is formed by the copolymerization (for example, using a bis-biphenyl-phenoxy metal complex) of at least the olefin and the silane monomer. An example of a silane monomer is depicted in Formula 1 or Formula 3, each as described herein. The silane monomer may or may not comprise one or more siloxane linkages.

The term "ethylene/silane interpolymer," as used herein, refers to a random interpolymer that comprises, in polymerized form, 50 wt % or a majority weight percent of ethylene (based on the weight of the interpolymer), and a silane monomer. As used herein, the interpolymer comprises at least one "—Si—H" group, as discussed above. The ethylene/silane interpolymer is formed by the copolymerization of at least the ethylene and the silane monomer. The silane monomer may or may not comprise one or more siloxane linkages.

The term "ethylene/silane copolymer," as used herein, refers to a random copolymer that comprises, in polymerized form, 50 wt % or a majority weight percent of ethylene (based on the weight of the copolymer), and a silane monomer, as the only two monomer types. As used herein, the copolymer comprises at least one "—Si—H" group, as discussed above. The ethylene/silane copolymer is formed by the copolymerization of the ethylene and the silane monomer. The silane monomer may or may not comprise one or more siloxane linkages.

The term “ethylene/alpha-olefin/silane interpolymer,” as used herein, refers to a random interpolymer that comprises, in polymerized form, 50 wt % or a majority weight percent of ethylene (based on the weight of the interpolymer), an alpha-olefin and a silane monomer. As used herein, the interpolymer comprises at least one “—Si—H” group, as discussed above. The ethylene/alpha-olefin/silane interpolymer is formed by the copolymerization of at least the ethylene, the alpha-olefin and the silane monomer. The silane monomer may or may not comprise one or more siloxane linkages.

The term “ethylene/alpha-olefin/silane terpolymer,” as used herein, refers to a random terpolymer that comprises, in polymerized form, 50 wt % or a majority weight percent of ethylene (based on the weight of the terpolymer), an alpha-olefin and a silane monomer as the only three monomer types. As used herein, the terpolymer comprises at least one “—Si—H” group, as discussed above. The ethylene/alpha-olefin/silane terpolymer is formed by the copolymerization of the ethylene, the alpha-olefin and the silane monomer. The silane monomer may or may not comprise one or more siloxane linkages.

The term “olefin/cyclic silane interpolymer,” as used herein, refers to a random interpolymer that comprises, in polymerized form, 50 wt % or a majority weight percent of an olefin (based on the weight of the interpolymer), and a cyclic silane monomer. As used herein, the interpolymer comprises at least one cyclic silane group, and the phrase “at least one cyclic silane group” refers to a type of cyclic silane group. It is understood in the art that the interpolymer would contain a multiple number of this cyclic silane type. The olefin/cyclic silane interpolymer is formed by the copolymerization (for example, using a bis-biphenyl-phenoxy metal complex) of at least the olefin and the cyclic silane monomer. Examples of a cyclic silane monomers are depicted in Formula 3, and in structures (s7) and (s8) of Formula 1, each as described herein. The cyclic silane monomer may or may not comprise one or more siloxane linkages. The terms “olefin/bicyclic silane interpolymer” and “olefin/bridged bicyclic silane interpolymer” are similarly described.

The term “ethylene/cyclic silane interpolymer,” as used herein, refers to a random interpolymer that comprises, in polymerized form, 50 wt % or a majority weight percent of ethylene (based on the weight of the interpolymer), and a cyclic silane monomer. As used herein, the interpolymer comprises at least one cyclic silane group, as discussed above. The ethylene/cyclic silane interpolymer is formed by the copolymerization of at least the ethylene and the cyclic silane monomer. The cyclic silane monomer may or may not comprise one or more siloxane linkages. The terms “ethylene/bicyclic silane interpolymer” and “ethylene/bridged bicyclic silane interpolymer” are similarly described.

The term “ethylene/cyclic silane copolymer,” as used herein, refers to a random copolymer that comprises, in polymerized form, 50 wt % or a majority weight percent of ethylene (based on the weight of the copolymer), and a cyclic silane monomer, as the only two monomer types. As used herein, the copolymer comprises at least one cyclic silane group, as discussed above. The ethylene/silane copolymer is formed by the copolymerization of the ethylene and the cyclic silane monomer. The cyclic silane monomer may or may not comprise one or more siloxane linkages. The terms “ethylene/bicyclic silane copolymer” and “ethylene/bridged bicyclic silane copolymer” are similarly described.

The term “ethylene/alpha-olefin/cyclic silane interpolymer,” as used herein, refers to a random interpolymer that comprises, in polymerized form, 50 wt % or a majority weight percent of ethylene (based on the weight of the interpolymer), an alpha-olefin and a cyclic silane monomer. As used herein, the interpolymer comprises at least one cyclic silane group, as discussed above. The ethylene/alpha-olefin/cyclic silane interpolymer is formed by the copolymerization of at least the ethylene, the alpha-olefin and the cyclic silane monomer. The cyclic silane monomer may or may not comprise one or more siloxane linkages. The terms “ethylene/alpha-olefin/bicyclic silane interpolymer” and “ethylene/alpha-olefin/bridged bicyclic silane interpolymer” are similarly described.

The term “ethylene/alpha-olefin/cyclic silane terpolymer,” as used herein, refers to a random terpolymer that comprises, in polymerized form, 50 wt % or a majority weight percent of ethylene (based on the weight of the terpolymer), an alpha-olefin and a cyclic silane monomer as the only three monomer types. As used herein, the terpolymer comprises at least one cyclic silane group, as discussed above. The ethylene/alpha-olefin/cyclic silane terpolymer is formed by the copolymerization of the ethylene, the alpha-olefin and the cyclic silane monomer. The cyclic silane monomer may or may not comprise one or more siloxane linkages. The terms “ethylene/alpha-olefin/bicyclic silane terpolymer” and “ethylene/alpha-olefin/bridged bicyclic silane terpolymer” are similarly described.

The phrase “a majority weight percent,” as used herein, in reference to a polymer (or interpolymer or copolymer), refers to the amount of monomer present in the greatest amount in the polymer.

The terms “hydrocarbon group,” “hydrocarbyl group,” and similar terms, as used herein, refer to a chemical group containing only carbon and hydrogen atoms.

The terms “heterohydrocarbon group,” “heterohydrocarbyl group,” and similar terms, as used herein, refer to a chemical group containing carbon, hydrogen and at least one heteroatom (for example, O, N or P).

The term “catalyst system,” as used herein, refers a composition comprising a metal complex (catalyst). The metal complex is typically rendered active by the use of one or more cocatalysts.

The term “metal complex,” as used herein, refers to a chemical structure comprising a metal or metal ion that is bonded and/or coordinated to one or more ligands (ions or molecules that contain one or more pairs of electrons that can be shared with the metal). See for example, the metal complexes of Table 2B below.

The term “Group 3-10 metal complex,” as used herein, refers to a metal complex containing a Group 3-10 metal atom or metal ion.

The term “addition polymerizable monomers,” and similar terms, as used herein, refer to monomers that each contain at least one carbon-carbon double bond (C═C), and preferably only one carbon-carbon double bond (C═C), via which the polymerization reaction takes place, without the co-generation of biproducts. Examples of such monomers include ethylene and alpha-olefins.

The term “scavenger,” as used herein, refers to a chemical compound added to a polymerization reaction to remove or deactivate impurities or unwanted reaction products (for example, oxygen).

The terms “comprising,” “including,” “having,” and their derivatives, are not intended to exclude the presence of any additional component, step or procedure, whether the same is specifically disclosed. In order to avoid any doubt, all compositions claimed through use of the term “comprising” may include any additional additive, adjuvant, or compound, whether polymeric or otherwise, unless stated to the contrary. In contrast, the term, “consisting essentially of” excludes from the scope of any succeeding recitation any other component, step or procedure, excepting those that are not essential to operability. The term “consisting of” excludes any component, step or procedure, not specifically delineated or listed.

Listing of Some Interpolymers and Processes

A1] An interpolymer, which comprises at least one siloxane group, said interpolymer prepared by polymerizing a mixture comprising one or more “addition polymerizable monomers” and at least one siloxane monomer, in the presence of a catalyst system comprising a Group 3-10 metal complex, and wherein the siloxane monomer is selected from the following Formula 1:

$$A_a\text{-}Si(B_b)(C_c)(H_{h0})—O—(Si(D_d)(E_e)(H_{h1})—O)_x—Si(F_f)(G_g)(H_{h2}) \quad \text{(Formula 1)},$$

where A is an alkenyl group, H is hydrogen;

B is a hydrocarbyl group, C is a hydrocarbyl group, and B and C may be the same or different;

a=1 or 2, b=0, 1 or 2, c=0, 1 or 2, h0=0, 1 or 2, a+b+c+h0=3;

D is a hydrocarbyl group, E is a hydrocarbyl group, and where D and E may be the same or different, and where D may be the same or different across the number of x units, further the same across the number of x units, and where E may be the same or different across the number of x units, further the same across the number of x units;

d=0, 1 or 2, e=0, 1 or 2, h1=0, 1 or 2, d+e+h1=2, x≥0;

F is a hydrocarbyl group, G is a hydrocarbyl group, and F and G may be the same or different;

f=0, 1 or 2, g=0, 1 or 2, h2=1 or 2, f+g+h2=3.

B1] The interpolymer of A1] above, wherein the interpolymer is an olefin/siloxane interpolymer, and further an ethylene/siloxane interpolymer.

C1] The interpolymer of A1] or B1] above, wherein the mixture further comprises a scavenger, and a Bronsted acid or a Lewis acid, and further a scavenger and a Bronsted acid.

D1] The interpolymer of any one of A1]-C1] (A1] through C1]) above, wherein, for Formula 1, x is from 0 to 10, or 0 to 8, or 0 to 6, or 0 to 4, or 0 to 2, or 0 or 1, or 0.

E1] The interpolymer of any one of A1]-D1] above, wherein, for Formula 1, A is a C2-C50 alkenyl group, and further a C2-C40 alkenyl group, further a C2-C30 alkenyl group, further a C2-C20 alkenyl group.

F1] The interpolymer of any one of A1]-E1] above, wherein, for Formula 1, A is selected from a linear aliphatic alkenyl group, a branched aliphatic alkenyl group, a cycloaliphatic alkenyl group, or a combination thereof.

G1] The interpolymer of any one of A1]-F1] above, wherein, for Formula 1, A is selected from the following structures i)-iv):

i) $R^1R^2C{=}CR^3$—, where each of $R^1$, $R^2$, $R^3$ is independently hydrogen, an alkyl group, or an aryl group, and wherein two or more from $R^1$, $R^2$, $R^3$ may be the same or different;

ii) $R^1R^2C{=}CR^3—(CR^4R^5)_n$—, where each of $R^1$, $R^2$, $R^3$, $R^4$, $R^5$ is independently hydrogen, an alkyl group, or an aryl group, and wherein two or more from $R^1$, $R^2$, $R^3$, $R^4$, $R^5$ may be the same or different, and n≥1;

iii)

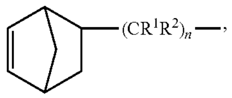

where each of $R^1$ and $R^2$ is independently hydrogen, an alkyl group, or an aryl group, and wherein $R^1$, and $R^2$ may be the same or different, and n≥1; or iv)

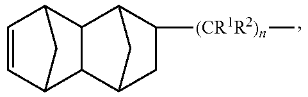

where each of $R^1$ and $R^2$ is independently hydrogen, an alkyl group, or an aryl group, and wherein $R^1$, and $R^2$ may be the same or different, and n≥1.

H1] The interpolymer of any one of A1]-G1] above, wherein, for Formula 1, A is selected from the following structures i)-iv):

i) $R^1R^2C{=}CR^3$—, where each of $R^1$, $R^2$ is independently hydrogen or an alkyl group, and $R^3$ is hydrogen, and wherein $R^1$ and $R^2$ may be the same or different;

ii) $R^1R^2C{=}CR^3—(CR^4R^5)_n$—, where each of $R^1$, $R^2$, $R^4$, $R^5$ is independently hydrogen, or an alkyl group, and $R^3$ is hydrogen, and wherein two or more from $R^1$, $R^2$, $R^4$, $R^5$ may be the same or different, and n is from 1 to 10, or 1 to 8, or 1 to 6, or 1 to 4, or 1 to 2, or 1;

iii)

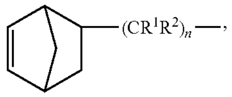

where each of $R^1$ and $R^2$ is independently hydrogen or an alkyl group, and wherein $R^1$, and $R^2$ may be the same or different, and n is from 1 to 10, or 1 to 8, or 1 to 6, or 1 to 4, or 1 to 2, or 1; or iv)

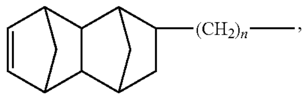

where each of $R^1$ and $R^2$ is independently hydrogen or an alkyl group, and wherein R', and $R^2$ may be the same or different, and n is from 1 to 10, or 1 to 8, or 1 to 6, or 1 to 4, or 1 to 2, or 1.

I1] The interpolymer of any one of A1]-H1] above, wherein, for Formula 1, A is selected from the following structures i)-iv):

i) $H_2C{=}CH{-}$;

ii) $H_2C{=}CH{-}(CH_2)_n{-}$, where n is from 1 to 10, or 1 to 8, or 1 to 6, or 1 to 4, or 1 to 2, or 1;

iii)

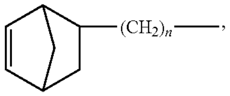

where n is from 1 to 10, or 1 to 8, or 1 to 6, or 1 to 4, or 1 to 2, or 1; or iv)

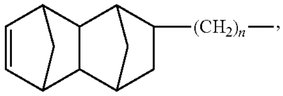

where n is from 1 to 10, or 1 to 8, or 1 to 6, or 1 to 4, or 1 to 2, or 1.

J1] The interpolymer of any one of A1]-I1] above, wherein, for Formula 1, B is an alkyl, further a C1-C5 alkyl, further a C1-C4 alkyl, further a C1-C3 alkyl, further a C1-C2 alkyl, further methyl.

K1] The interpolymer of any one of A1]-J1] above, wherein, for Formula 1, C is an alkyl, further a C1-C5 alkyl, further a C1-C4 alkyl, further a C1-C3 alkyl, further a C1-C2 alkyl, further methyl.

L1] The interpolymer of any one of A1]-K1] above, wherein, for Formula 1, D is an alkyl, further a C1-C5 alkyl, further a C1-C4 alkyl, further a C1-C3 alkyl, further a C1-C2 alkyl, further methyl.

M1] The interpolymer of any one of A1]-L1] above, wherein, for Formula 1, E is an alkyl, further a C1-C5 alkyl, further a C1-C4 alkyl, further a C1-C3 alkyl, further a C1-C2 alkyl, further methyl.

N1] The interpolymer of any one of A1]-M1] above, wherein, for Formula 1, F is an alkyl, further a C1-C5 alkyl, further a C1-C4 alkyl, further a C1-C3 alkyl, further a C1-C2 alkyl, further methyl.

O1] The interpolymer of any one of A1]-N1] above, wherein, for Formula 1, G is an alkyl, further a C1-C5 alkyl, further a C1-C4 alkyl, further a C1-C3 alkyl, further a C1-C2 alkyl, further methyl.

P1] The interpolymer of any one of A1]-O1] above, wherein, for Formula 1, a=1, b=1, c=1, h0=0; d=1, e=1, $h_1=0$; and f=1, g=1, $h_2=1$.

Q1] The interpolymer of any one of A1]-P1] above, wherein, for Formula 1, x=0.

R1] The interpolymer of any one of A1]-Q1] above, wherein, the interpolymer comprises only one type of siloxane group.

S1] The interpolymer of any one of A1]-R1] above, wherein, the interpolymer comprises, in polymerized form, ≥0.10 wt %, or ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of the siloxane monomer, based on the weight of the interpolymer.

T1] The interpolymer of any one of A1]-S1] above, wherein, the interpolymer comprises, in polymerized form, ≤10 wt %, or ≤9.0 wt %, or ≤8.0 wt %, or ≤7.0 wt %, or ≤6.0 wt %, or ≤5.0 wt %, or ≤4.8 wt %, or ≤4.6 wt %, or ≤4.4 wt %, or ≤4.2 wt %, or ≤4.0 wt % of the siloxane monomer, based on the weight of the interpolymer.

U1] The interpolymer of any one of A1]-T1] above, wherein, the interpolymer comprises, in polymerized form, ≥0.10 mol %, or ≥0.12 mol %, or ≥0.15 mol %, or ≥0.17 mol %, or ≥0.19 mol % of the siloxane monomer, based on the total moles of polymerized monomers in the interpolymer.

V1] The interpolymer of any one of A1]-U1] above, wherein, the interpolymer comprises, in polymerized form, ≤5.00 mol %, or ≤4.00 mol %, or ≤3.00, or ≤2.00 mol %, or ≤1.50 mol %, or ≤1.00 mol % of the siloxane monomer, based on the total moles of polymerized monomers in the interpolymer.

W1] The interpolymer of any one of A1]-V1] above, wherein Formula 1 is selected from the following compounds a1) through d1) below:

a1) $R^1R^2C{=}CR^3{-}Si(R^4)(R^5){-}O{-}[Si(R^6)(R^7){-}O]_m{-}Si(R^8)(R^9)(R^{10})$, where $R^{10}$ is hydrogen, and each of $R^1$, $R^2$, $R^3$, $R^4$, $R^5$, $R^6$, $R^7$, $R^8$, $R^9$ is independently hydrogen, an alkyl group, or an aryl group, and wherein two or more of $R^1$-$R^9$ may the same or different; and m≥0;

b1) $R^1R^2C{=}CR^3{-}(CR^4R^5)_n{-}Si(R^6)(R^7){-}O{-}[Si(R^8)(R^9){-}O]_m{-}Si(R^{10})(R^{11})(R^{12})$, where $R^{12}$ is hydrogen, and each of $R^1$-$R^{11}$ is independently hydrogen, an alkyl group, or an aryl group, and wherein two or more of $R^1$-$R^{11}$ may the same or different; and n≥1, and m≥0;

c1)

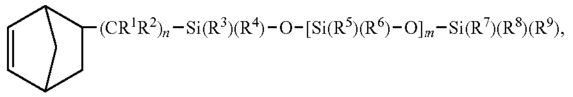

where $R^9$ is hydrogen, and each of $R^1$-$R^8$ is independently hydrogen, an alkyl group, or an aryl group, and wherein two or more of $R^1$-$R^8$ may the same or different; and n≥1, and m≥0; or d1)

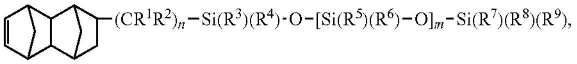

where $R^9$ is hydrogen, and each of $R^1$-$R^8$ is independently hydrogen, an alkyl group, or an aryl group, and wherein two or more of $R^1$-$R^8$ may the same or different; and n≥1, and m≥0.

X1] The interpolymer of any one of A1]-W1] above, wherein Formula 1 is selected from the following compounds a2) through d2) below:

a2) $R^1R^2C{=}CR^3{-}Si(R^4)(R^5){-}O{-}[Si(R^6)(R^7){-}O]_m{-}Si(R^8)(R^9)(R^{10})$, where each of $R^1$, $R^2$, $R^3$ and $R^{10}$ is hydrogen; and each of $R^4$, $R^5$, $R^6$, $R^7$, $R^8$, $R^9$ is independently an alkyl group, further a C1-C5 alkyl, further a C1-C4 alkyl, further a C1-C3 alkyl, further a C1-C2 alkyl, further methyl; and wherein two or more of $R^4$-$R^9$ may the same or different; and m is from 0 to 4, or 0 to 3, or 0 to 2, or 0 to 1, or 0;

b2) $R^1R^2C{=}CR^3{-}(CR^4R^5){\sim}{-}Si(R^6)(R^7){-}O{-}[Si(R^8)(R^9){-}O]_m{-}Si(R^{10})(R^{11})(R^{12})$, where each of $R^1$, $R^2$, $R^3$, $R^4$, $R^5$ and $R^{12}$ is hydrogen; and each of $R^6$, $R^7$, $R^8$, $R^9$, $R^{10}$, $R^{11}$ is independently an alkyl group, further a C1-C5 alkyl, further a C1-C4 alkyl, further a C1-C3 alkyl, further a C1-C2 alkyl, further methyl; and wherein two or more of $R^6$-$R^{11}$ may the same or different; and n is from 1 to 10, or 1 to 8, or 1 to 6, or 1 to 4, or 1 to 2, or 1, and m is from 0 to 4, or 0 to 3, or 0 to 2, or 0 to 1, or 0;

c2)

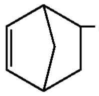 $-(CR^1R^2)_n-Si(R^3)(R^4)-O-[Si(R^5)(R^6)-O]_m-Si(R^7)(R^8)(R^9)$, where each of $R^1$, $R^2$ and $R^9$ is hydrogen; and each of $R^3$-$R^8$ is independently an alkyl group, further a C1-C5 alkyl, further a C1-C4 alkyl, further a C1-C3 alkyl, further a C1-C2 alkyl, further methyl; and wherein two or more of $R^3$-$R^8$ may the same or different; and n is from 1 to 10, or 1 to 8, or 1 to 6, or 1 to 4, or 1 to 2, or 1, and m is from 0 to 4, or 0 to 3, or 0 to 2, or 0 to 1, or 0; or d2)

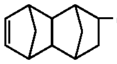 $-(CR^1R^2)_n-Si(R^3)(R^4)-O-[Si(R^5)(R^6)-O]_m-Si(R^7)(R^8)(R^9)$, where each of $R^1$, $R^2$ and $R^9$ is hydrogen; and each of $R^3$-$R^8$ is independently an alkyl group, further a C1-C5 alkyl, further a C1-C4 alkyl, further a C1-C3 alkyl, further a C1-C2 alkyl, further methyl; and wherein two or more of $R^3$-$R^8$ may the same or different; and n is from 1 to 10, or 1 to 8, or 1 to 6, or 1 to 4, or 1 to 2, or 1, and m is from 0 to 4, or 0 to 3, or 0 to 2, or 0 to 1, or 0.

Y1] The interpolymer of any one of A1]-X1] above, wherein Formula 1 is selected from the following compounds s1) through s8) below:

(s1)

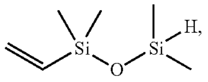

(s2)

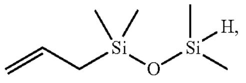

(s3)

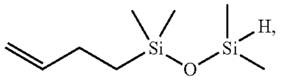

(s4)

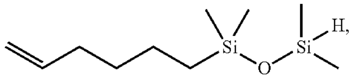

(s5)

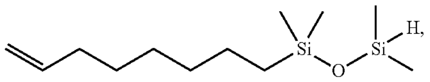

(s6)

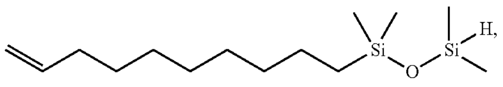

-continued (s7)

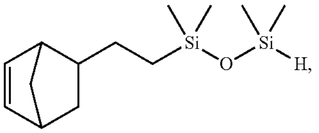

or (s8)

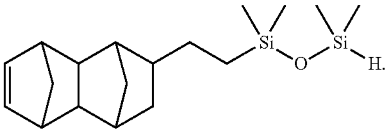

Z1] The interpolymer of any one of A1]-Y1] above, wherein the one or more "addition polymerizable monomers" comprise ethylene and/or an alpha-olefin, and further ethylene and an alpha-olefin.

A2] The interpolymer of Z1] above, wherein the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

B2] The interpolymer of any one of A1]-A2] above, wherein "the interpolymer comprises, in polymerized form, ≥50 wt %, or ≥60 wt %, or ≥70 wt %, or ≥80 wt %, or ≥90 wt % ethylene, based on the weight of the interpolymer.

C2] The interpolymer of any one of A1]-B2] above, wherein "the interpolymer comprises, in polymerized form, ≤100 wt %, or ≤99 wt %, or ≤98 wt %, or ≤95 wt % ethylene, based on the weight of the interpolymer.

D2] The interpolymer of any one of Z1]-C2] above, wherein, the interpolymer comprises, in polymerized form, ≥3.0 mol %, or ≥4.0 mol %, or ≥5.0 mol %, or ≥6.0 mol %, or ≥7.0 mol % of the alpha-olefin, based on the total moles of polymerized monomers in the interpolymer.

E2] The interpolymer of any one of Z1]-D2] above, wherein, the interpolymer comprises, in polymerized form, ≤25.0 mol %, or ≤20.0 mol %, or ≤18.0 mol %, or ≤16.0 mol % of the alpha-olefin, based on the total moles of polymerized monomers in the interpolymer.

F2] The interpolymer of any one of A1]-E2] above, wherein the interpolymer has a molecular weight distribution (MWD=Mw/Mn)≥1.80, or ≥1.90, or ≥2.00.

G2] The interpolymer of any one of A1]-F2] above, wherein the interpolymer has a molecular weight distribution MWD≤4.00, or ≤3.50, or ≤3.00, or ≤2.90, or ≤2.80.

H2] The interpolymer of any one of A1]-G2] above, wherein the interpolymer has a number average molecular weight (Mn)≥10,000 g/mol, or ≥12,000 g/mol, or ≥14,000 g/mol, or ≥16,000 g/mol, or ≥18,000 g/mol.

I2] The interpolymer of any one of A1]-H2] above, wherein the interpolymer has a number average molecular weight (Mn)≤600,000 g/mol, or ≤580,000 g/mol, or ≤560,000 g/mol, or ≤540,000 g/mol, or ≤520,000 g/mol.

J2] The interpolymer of any one of A1]-I2] above, wherein the interpolymer has a weight average molecular weight (Mw)≥20,000 g/mol, or ≥25,000 g/mol, or ≥30,000 g/mol, or ≥32,000 g/mol, or ≥34,000 g/mol, or ≥36,000 g/mol, or ≥38,000 g/mol, or ≥40,000 g/mol.

K2] The interpolymer of any one of A]-J2] above, wherein the interpolymer has a weight average molecular weight (Mw)≤2,000,000 g/mol, or ≤1,800,000 g/mol, or ≤1,600,000 g/mol, or ≤1,400,000 g/mol, or ≤1,200,000 g/mol, or ≤1,100,000 g/mol.

L2] The interpolymer of any one of A1]-K2] above, wherein the interpolymer has a density ≥0.855 g/cc, or ≥0.856 g/cc, or ≥0.858 g/cc, or ≥0.860 g/cc, or ≥0.862 g/cc, or ≥0.864 g/cc, or ≥0.866 g/cc (1 cc=1 $cm^3$).

M2] The interpolymer of any one of A1]-L2] above, wherein the interpolymer has a density ≤0.950 g/cc, or ≤0.920 g/cc, or ≤0.900 g/cc, or ≤0.888 g/cc, or ≤0.886 g/cc, or ≤0.884 g/cc, or ≤0.882 g/cc, or ≤0.880 g/cc, or ≤0.878 g/cc, or ≤0.876 g/cc.

N2] The interpolymer of any one of A1]-M2] above, wherein the interpolymer has a melt index (I2)≥0.5 dg/min, or ≥1.0 dg/min, or ≥2.0 dg/min, or ≥5.0 dg/min, or ≥10 dg/min.

O2] The interpolymer of any one of A1]-N2] above, wherein the interpolymer has a melt index (I2)≤1,000 dg/min, or ≤500 dg/min, or ≤250 dg/min, or ≤100 dg/min, or ≤50 dg/min, or ≤20 dg/min.

P2] The interpolymer of any one of A1]-O2] above, wherein the interpolymer of has a melting temperature ($T_m$)≥30° C., or ≥35° C., or ≥38° C., or ≥40° C., or ≥42° C.

Q2] The interpolymer of any one of A1]-P2] above, wherein the interpolymer has a melting temperature ($T_m$)≤100° C., or ≤95° C., or ≤90° C., or ≤88° C.

R2] The interpolymer of any one of A1]-Q2] above, wherein the interpolymer of has a glass transition temperature ($T_g$)≥−70° C., or ≥−68° C., or ≥−66° C., or ≥−64° C., or ≥−62° C.

S2] The interpolymer of any one of A1]-R2] above, wherein the interpolymer has a glass transition temperature ($T_g$)≤−40° C., or ≤−42° C., or ≤−44° C., or ≤−46° C.

T2] A derivative of the interpolymer any one of A1]-S2] above, wherein the derivative is formed by one or more subsequent siloxane conversion processes selected from the group consisting of a)-e) below:

a) coupling of one or more chains of the interpolymer;

b) hydrolysis, alcoholysis, oxidation, or aminolysis to give Si—$OR^4$ or Si—$NR^4_2$ groups, where $R^4$ is H or a $C_1$-$C_{10}$ hydrocarbyl;

c) hydrolysis and neutralization to give ionomers having Si—$OR^6$ groups, where $R^6$ is a metal cation;

d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups; and e) modification through hydrosilylation or a Piers Rubinsztajn reaction.

U2] A composition comprising the interpolymer any one of A1]-S2] above, and at least one additive.

V2] A composition comprising the derivative interpolymer of T2] above, and at least one additive.

W2] The composition of U2] or V2] above, wherein the additive is selected from an antioxidant, a filler, an oil, or combinations thereof.

X2] The composition of U2] or W2] above, wherein the composition further comprises a thermoplastic polymer, different from the interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

Y2] The composition of V2] or W2] above, wherein the composition further comprises a thermoplastic polymer, different from the derivative interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

Z2] The composition of any one of U2], W2] or X2] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the interpolymer, based on the weight of the composition.

A3] The composition of any one of U2], W2], X2] or Z2] above, wherein the composition comprises ≤99.9 wt %, or ≤99.8 wt %, or ≤99.6 wt %, or ≤99.4 wt %, or ≤99.2 wt % of the interpolymer, based on the weight of the composition.

B3] The composition of any one of V2], W2] or Y2] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the derivative interpolymer, based on the weight of the composition.

C3] The process of any one of V2], W2], Y2] or B3] above, wherein the composition comprises ≤99.9 wt %, or ≤99.8 wt %, or ≤99.6 wt %, or ≤99.4 wt %, or ≤99.2 wt % of the derivative interpolymer, based on the weight of the composition.

D3] An article comprising at least one component formed from the composition of any one of U2]-C3] above.

E3] The article of D3] above, wherein the article is a film.

F3] The article of D3] above, wherein the article is a solar cell module, a cable, a footwear component, an automotive part, a window profile, a tire, a tube, or a roofing membrane.

G3] A process of making the interpolymer of any one of A1]-S2] above, said process comprising polymerizing a mixture comprising one or more “addition polymerizable monomers” and at least one siloxane monomer, in the presence of a catalyst system comprising a Group 3-10 metal complex, and wherein the siloxane monomer is selected from Formula 1, as described herein.

H3] The process of G3] above, wherein the mixture further comprises a scavenger, and a Bronsted acid or a Lewis acid, and further a scavenger and a Bronsted acid.

I3] The process of G3] or H3] above, wherein the metal complex is selected from Formula A, as described herein.

J3] The process of G3] or H3] above, wherein the metal complex is selected from Formula B, as described herein.

K3] The process of any one of G3]-J3] above, wherein the polymerization has an efficiency ≥130,000, or ≥140,000, or ≥150,000 g polymer/g catalyst.

L3] The process of any one of G3]-K3] above, wherein the polymerization has an efficiency ≤410,000, or ≤400,000, or ≤390,000 g polymer/g catalyst.

M3] The process of any one of G3]-L3] above, wherein the polymerization takes place at a temperature ≥90° C., or ≥95° C., or ≥100° C., or ≥105° C., or ≥110° C., or ≥115° C.

N3] The process of any one of G3]-M3] above, wherein the polymerization takes place at a temperature ≤200° C., or ≤190° C., or ≤180° C., or ≤170° C., or ≤160° C., or ≤150° C., or ≤145° C., or ≤140° C., or ≤135° C., or ≤130° C., or ≤125° C.

O3] The process of any one of G3]-N3] above, wherein the polymerization takes place at a pressure ≥90 psi, or ≥95 psi, or ≥100 psi, or ≥105 psi, or ≥110 psi.

P3] The process of any one of G3]-O3] above, wherein the polymerization takes place at a pressure ≤160 psi, or ≤155 psi, or ≤150 psi, or ≤145 psi, or ≤140 psi, or ≤135 psi, or ≤130 psi, or ≤125 psi.

A4] An ethylene/siloxane interpolymer comprising at least one chemical unit of Structure 1 or at least one chemical unit of Structure 2, each as shown below:

(Structure 1)

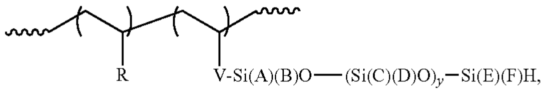

wherein y≥0; H is hydrogen; R is hydrogen or an alkyl, and further hydrogen; V is a hydrocarbylene group;

A is a hydrocarbyl group or hydrogen, B is a hydrocarbyl group or hydrogen, and A and B may be the same or different;

C is a hydrocarbyl group or hydrogen, D is a hydrocarbyl group or hydrogen, and C and D may be the same or different, and where C and may be the same or different across the number of y units, further the same across the number of y units, and where D may be the same or different across the number of y units, further the same across the number of y units;

E is a hydrocarbyl group or hydrogen, F is a hydrocarbyl group or hydrogen, and E and F may be the same or different;

(Structure 2)

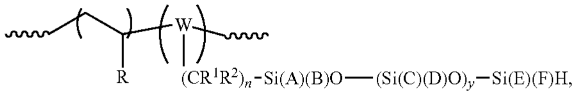

wherein y≥0; and n≥1; H is hydrogen; R is hydrogen or an alkyl, further hydrogen; —W— is a -(cyclic)-group;

each of $R^1$ and $R^2$ is independently hydrogen or a hydrocarbyl group, and wherein $R^1$ and $R^2$ may be the same or different;

A is a hydrocarbyl group or hydrogen, B is a hydrocarbyl group or hydrogen, and A and B may be the same or different;

C is a hydrocarbyl group or hydrogen, D is a hydrocarbyl group or hydrogen, and C and D may be the same or different, and where C and may be the same or different across the number of y units, further the same across the number of y units, and where D may be the same or different across the number of y units, further the same across the number of y units;

E is a hydrocarbyl group or hydrogen, F is a hydrocarbyl group or hydrogen, and E and F may be the same or different.

B4] The interpolymer of A4] above, wherein the interpolymer is an ethylene/alpha-olefin/siloxane interpolymer, and further an ethylene/alpha-olefin/siloxane terpolymer. Further the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

C4] The interpolymer of A4] or B4] above, wherein, for Structure 1, V is an alkylene group, and further a linear aliphatic alkylene group, a branched aliphatic alkylene group, a cycloaliphatic alkylene group, or a combination thereof.

D4] The interpolymer of any one of A4]-B4] above, wherein, for Structure 1, V is selected from $—(CR^1R^2)_x—$, wherein each of $R^1$ and $R^2$ is independently hydrogen, an alkyl group, or an aryl group, further hydrogen or an alkyl group, and wherein $R^1$ and $R^2$ may be the same or different; and x≥1, further x is from 1 to 10, or 1 to 8, or 1 to 6, or 1 to 4, or 1 to 2, or 1.

E4] The interpolymer of any one of A4]-D4] above, wherein, for Structure 1, V is selected from $—(CH_2)_x—$, wherein x is from 1 to 10, or 1 to 8, or 1 to 6, or 1 to 4, or 1 to 2, or 1.

F4] The interpolymer of any one of A4]-E4] above, wherein, for Structure 1, y is from 0 to 10, or 0 to 8, or 0 to 6, or 0 to 4, or 0 to 2, or 0 or 1, or 0.

G4] The interpolymer of any one of A4]-F4] above, wherein, for Structure 1, A is an alkyl, further a C1-C5 alkyl, further a C1-C4 alkyl, further a C1-C3 alkyl, further a C1-C2 alkyl, further methyl.

H4] The interpolymer of any one of A4]-G4] above, wherein, for Structure 1, B is an alkyl, further a C1-C5 alkyl, further a C1-C4 alkyl, further a C1-C3 alkyl, further a C1-C2 alkyl, further methyl.

I4] The interpolymer of any one of A4]-H4] above, wherein, for Structure 1, C is an alkyl, further a C1-C5 alkyl, further a C1-C4 alkyl, further a C1-C3 alkyl, further a C1-C2 alkyl, further methyl.

J4] The interpolymer of any one of A4]-I4] above, wherein, for Structure 1, D is an alkyl, further a C1-C5 alkyl, further a C1-C4 alkyl, further a C1-C3 alkyl, further a C1-C2 alkyl, further methyl.

K4] The interpolymer of any one of A4]-J4] above, wherein, for Structure 1, E is an alkyl, further a C1-C5 alkyl, further a C1-C4 alkyl, further a C1-C3 alkyl, further a C1-C2 alkyl, further methyl.

L4] The interpolymer of any one of A4]-K4] above, wherein, for Structure 1, F is an alkyl, further a C1-C5 alkyl, further a C1-C4 alkyl, further a C1-C3 alkyl, further a C1-C2 alkyl, further methyl.

M4] The interpolymer of any one of A4]-L4] above, wherein Structure 1 is selected from the following Structure 1a below:

(Structure 1a)

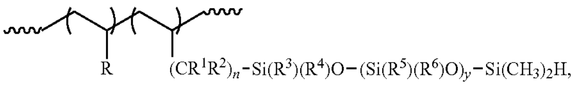

wherein R is hydrogen or an alkyl, further hydrogen; and each of $R^1$ and $R^2$ is independently hydrogen or an alkyl group, and $R^1$ and $R^2$ may the same or different, and further $R^1$ and $R^2$ are each hydrogen; and wherein each of $R^3$-$R^8$ is independently an alkyl group, further a C1-C5 alkyl, further a C1-C4 alkyl, further a C1-C3 alkyl, further a C1-C2 alkyl, further methyl; and wherein two or more of $R^3$-$R^8$ may the same or different; n is from 1 to 10, or 1 to 8, or 1 to 6, or 1 to 4, or 1 to 2, or 1, and y is from 0 to 4, or 0 to 3, or 0 to 2, or 0 or 1, or 0.

N4] The interpolymer of any one of A4]-M4] above, wherein Structure 1 is selected from the following Structure 1b below:

(Structure 1b)

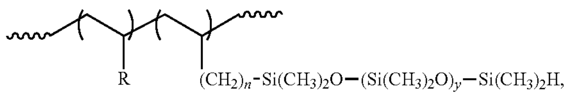

wherein R is hydrogen or an alkyl, further hydrogen; and n is from 1 to 10, or 1 to 8, or 1 to 6, or 1 to 4, or 1 to 2, or 1, and y is from 0 to 4, or 0 to 3, or 0 to 2, or 0 or 1, or 0.

O4] The interpolymer of any one of A4]-N4] above, wherein the interpolymer comprises at least one (type) chemical unit of Structure 1, and further only one (type) of chemical unit of Structure 1.

P4] The interpolymer of any one of A4]-N4] above, wherein, for Structure 2, —W— comprises 7 to 50 carbon atoms, or 7 to 40 carbon atoms, or 7 to 30 carbon atoms, or 7 to 20 carbon atoms.

Q4] The interpolymer of any one of A4]-P4] above, wherein, for Structure 2, —W— is a -(bicyclic)- group, and further a -(bridged bicyclic)- group.

R4] The interpolymer of any one of A4]-Q4] above, wherein, for Structure 2, —W— is selected from structures w1 and w2 below. Note, for each structure, the notation "∿∿∿" refers to the point of attachment of the structure to the "—$(CR^1R^2)_n$—" of the remaining portion of the Structure 2 (described herein).

(w1)

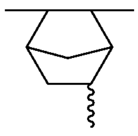

or (w2)

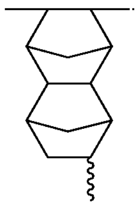

S4] The interpolymer of any one of A4]-R4] above, wherein, for Structure 2, y is from 0 to 10, or 0 to 8, or 0 to 6, or 0 to 4, or 0 to 2, or 0 or 1, or 0.

T4] The interpolymer of any one of A4]-S4] above, wherein, for Structure 2, A is an alkyl, further a C1-C5 alkyl, further a C1-C4 alkyl, further a C1-C3 alkyl, further a C1-C2 alkyl, further methyl.

U4] The interpolymer of any one of A4]-T4] above, wherein, for Structure 2, B is an alkyl, further a C1-C5 alkyl, further a C1-C4 alkyl, further a C1-C3 alkyl, further a C1-C2 alkyl, further methyl.

V4] The interpolymer of any one of A4]-U4] above, wherein, for Structure 2, C is an alkyl, further a C1-C5 alkyl, further a C1-C4 alkyl, further a C1-C3 alkyl, further a C1-C2 alkyl, further methyl.

W4] The interpolymer of any one of A4]-V4] above, wherein, for Structure 2, D is an alkyl, further a C1-C5 alkyl, further a C1-C4 alkyl, further a C1-C3 alkyl, further a C1-C2 alkyl, further methyl.

X4] The interpolymer of any one of A4]-W4] above, wherein, for Structure 2, E is an alkyl, further a C1-C5 alkyl, further a C1-C4 alkyl, further a C1-C3 alkyl, further a C1-C2 alkyl, further methyl.

Y4] The interpolymer of any one of A4]-X4] above, wherein, for Structure 2, F is an alkyl, further a C1-C5 alkyl, further a C1-C4 alkyl, further a C1-C3 alkyl, further a C1-C2 alkyl, further methyl.

Z4] The interpolymer of any one of A4]-Y4] above, wherein Structure 2 is selected from the following Structure 2a or Structure 2a' below:

(Structure 2a)

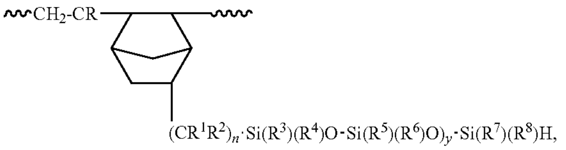

wherein R is hydrogen or an alkyl, further hydrogen; and each of $R^1$ and $R^2$ is independently hydrogen or an alkyl group, and $R^1$ and $R^2$ may the same or different, and further $R^1$ and $R^2$ are each hydrogen; and wherein each of $R^3$-$R^8$ is independently an alkyl group, further a C1-C5 alkyl, further a C1-C4 alkyl, further a C1-C3 alkyl, further a C1-C2 alkyl, further methyl; and wherein two or more of $R^3$-$R^8$ may the same or different; n is from 1 to 10, or 1 to 8, or 1 to 6, or 1 to 4, or 1 to 2, or 1, and y is from 0 to 4, or 0 to 3, or 0 to 2, or 0 or 1, or 0, or (Structure 2a')

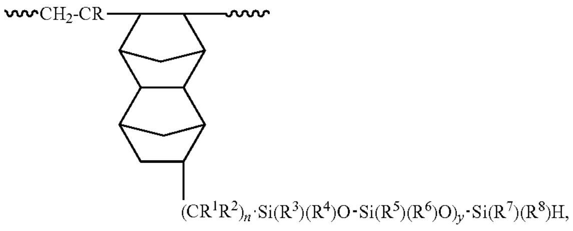

wherein R is hydrogen or an alkyl, further hydrogen; and each of $R^1$ and $R^2$ is independently hydrogen or an alkyl group, and $R^1$ and $R^2$ may the same or different, and further $R^1$ and $R^2$ are each hydrogen; and wherein each of $R^3$-$R^8$ is independently an alkyl group, further a C1-C5 alkyl, further a C1-C4 alkyl, further a C1-C3 alkyl, further a C1-C2 alkyl, further methyl; and wherein two or more of $R^3$-$R^8$ may the same or different; n is from 1 to 10, or 1 to 8, or 1 to 6, or 1 to 4, or 1 to 2, or 1, and y is from 0 to 4, or 0 to 3, or 0 to 2, or 0 or 1, or 0.

A5] The interpolymer of any one of A4]-Z4] above, wherein Structure 2 is selected from the following Structure 2b or Structure 2b' below:

(Structure 2b)

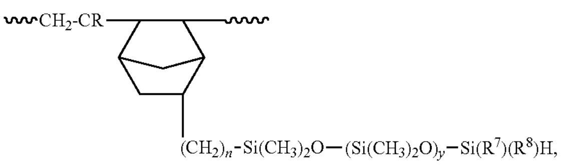

wherein R is hydrogen or an alkyl, further hydrogen; and n is from 1 to 10, or 1 to 8, or 1 to 6, or 1 to 4, or 1 to 2, or 1, and y is from 0 to 4, or 0 to 3, or 0 to 2, or 0 or 1, or 0, or (Structure 2b')

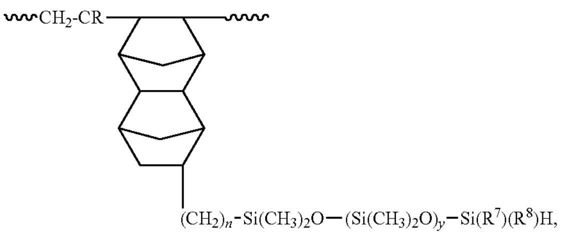

wherein R is hydrogen or an alkyl, further hydrogen; and n is from 1 to 10, or 1 to 8, or 1 to 6, or 1 to 4, or 1 to 2, or 1, and y is from 0 to 4, or 0 to 3, or 0 to 2, or 0 or 1, or 0.

B5] The interpolymer of any one of A4]-A5] above, wherein the interpolymer comprises at least one (type) chemical unit of Structure 2, and further only one (type) of chemical unit of Structure 2.

C5] The interpolymer of any one of A4]-B5] above, wherein the interpolymer further comprises, in polymerize form, an alpha-olefin.

D5] The interpolymer of C5] above, wherein the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

E5] The interpolymer of any one of A4]-D5] above, wherein the polymerized siloxane monomer portion of each of Structure 1 or Structure 2 is derived from a respective siloxane monomer, and wherein the interpolymer comprises, in polymerized form, ≥0.10 wt %, or ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of the siloxane monomer, based on the weight of the interpolymer.

F5] The interpolymer of any one of A4]-E5] above, wherein the polymerized siloxane monomer portion of each of Structure 1 or Structure 2 is derived from a respective siloxane monomer, and wherein the interpolymer comprises, in polymerized form, ≤10 wt %, or ≤9.0 wt %, or ≤8.0 wt %, or ≤7.0 wt %, or ≤6.0 wt %, or ≤5.0 wt %, or ≤4.8 wt %, or ≤4.6 wt %, or ≤4.4 wt %, or ≤4.2 wt %, or ≤4.0 wt % of the siloxane monomer, based on the weight of the interpolymer.

G5] The interpolymer of any one of A4]-F5] above, wherein the polymerized siloxane monomer portion of each of Structure 1 or Structure 2 is derived from a respective siloxane monomer, and wherein the interpolymer comprises, in polymerized form, ≥0.10 mol %, or ≥0.12 mol %, or ≥0.15 mol %, or ≥0.17 mol %, or ≥0.19 mol % of the siloxane monomer, based on the total moles of polymerized monomers in the interpolymer.

H5] The interpolymer of any one of A4]-G5] above, wherein the polymerized siloxane monomer portion of each of Structure 1 or Structure 2 is derived from a respective siloxane monomer, and wherein the interpolymer comprises, in polymerized form, ≤5.00 mol %, or ≤4.00 mol %, or ≤3.00, or ≤2.00 mol %, or ≤1.50 mol %, or ≤1.00 mol % of the siloxane monomer, based on the total moles of polymerized monomers in the interpolymer.

I5] The interpolymer of any one of A4]-H5] above, wherein the interpolymer has a molecular weight distribution (MWD=Mw/Mn)≥1.80, or ≥1.90, or ≥2.00.

J5] The interpolymer of any one of A4]-I5] above, wherein the interpolymer has a molecular weight distribution MWD≤4.00, or ≤3.50, or ≤3.00, or ≤2.90, or ≤2.80.

K5] The interpolymer of any one of A4]-J5] above, wherein the interpolymer has a number average molecular weight (Mn)≥10,000 g/mol, or ≥12,000 g/mol, or ≥14,000 g/mol, or ≥16,000 g/mol, or ≥18,000 g/mol.

L5] The interpolymer of any one of A4]-K5] above, wherein the interpolymer has a number average molecular weight (Mn)≤600,000 g/mol, or ≤580,000 g/mol, or ≤560,000 g/mol, or ≤540,000 g/mol, or ≤520,000 g/mol.

M5] The interpolymer of any one of A4]-L5] above, wherein the interpolymer has a weight average molecular weight (Mw)≥20,000 g/mol, or ≥25,000 g/mol, or ≥30,000 g/mol, or ≥32,000 g/mol, or ≥34,000 g/mol, or ≥36,000 g/mol, or ≥38,000 g/mol, or ≥40,000 g/mol.

N5] The interpolymer of any one of A4]-M5] above, wherein the interpolymer has a weight average molecular weight (Mw)≤2,000,000 g/mol, or ≤1,800,000 g/mol, or ≤1,600,000 g/mol, or ≤1,400,000 g/mol, or ≤1, 200,000 g/mol, or ≤1,100,000 g/mol.

O5] The interpolymer of any one of A4]-N5] above, wherein the interpolymer has a density ≥0.855 g/cc, or ≥0.856 g/cc, or ≥0.858 g/cc, or ≥0.860 g/cc, or ≥0.862 g/cc, or ≥0.864 g/cc, or ≥0.866 g/cc (1 cc=1 $cm^3$).

P5] The interpolymer of any one of A4]-O5] above, wherein the interpolymer has a density ≤0.950 g/cc, or ≤0.920 g/cc, or ≤0.900 g/cc, or ≤0.890 g/cc, or ≤0.888 g/cc, or ≤0.886 g/cc, or ≤0.884 g/cc, or ≤0.882 g/cc, or ≤0.880 g/cc, or ≤0.878 g/cc, or ≤0.876 g/cc.

Q5] The interpolymer of any one of A4]-P5] above, wherein the interpolymer has a melt index (I2)≥0.5 dg/min, or ≥1.0 dg/min, or ≥2.0 dg/min, or ≥5.0 dg/min, or ≥10 dg/min.

R5] The interpolymer of any one of A4]-Q5] above, wherein the interpolymer has a melt index (I2)≤1,000 dg/min, or ≤500 dg/min, or ≤250 dg/min, or ≤100 dg/min, or ≤50 dg/min, or ≤20 dg/min.

S5] The interpolymer of any one of A4]-R5] above, wherein the interpolymer of has a melting temperature ($T_m$)≥30° C., or ≥35° C., or ≥38° C., or ≥40° C., or ≥42° C.

T5] The interpolymer of any one of A4]-S5] above, wherein the interpolymer has a melting temperature ($T_m$)≤100° C., or ≤95° C., or ≤90° C., or ≤88° C.

U5] The interpolymer of any one of A4]-T5] above, wherein the interpolymer of has a glass transition temperature ($T_g$)≥−70° C., or ≥−68° C., or ≥−66° C., or ≥−64° C., or ≥−62° C.

V5] The interpolymer of any one of A4]-U5] above, wherein the interpolymer has a glass transition temperature ($T_g$)≤−40° C., or ≤−42° C., or ≤−44° C., or ≤−46° C.

W5] A derivative of the interpolymer any one of A4]-V5] above, wherein the derivative is formed by one or more subsequent siloxane conversion processes selected from the group consisting of a)-e) below:

a) coupling of one or more chains of the interpolymer;

b) hydrolysis, alcoholysis, oxidation, or aminolysis to give Si—$OR^4$ or Si—$NR^4_2$ groups, where $R^4$ is H or a $C_1$-$C_{10}$ hydrocarbyl;

c) hydrolysis and neutralization to give ionomers having Si—$OR^6$ groups, where $R^6$ is a metal cation;

d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups; and e) modification through hydrosilylation or a Piers Rubinsztajn reaction.

X5] A composition comprising the interpolymer any one of A4]-V5] above, and at least one additive.

Y5] A composition comprising the derivative interpolymer of W5] above, and at least one additive.

Z5] The composition of X5] or Y5] above, wherein the additive is selected from an antioxidant, a filler, an oil, or combinations thereof.

A6] The composition of X5] or Z5] above, wherein the composition further comprises a thermoplastic polymer, different from the interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

B6] The composition of Y5] or Z5] above, wherein the composition further comprises a thermoplastic polymer, different from the derivative interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

C6] The composition of any one of X5], Z5] or A6] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the interpolymer, based on the weight of the composition.

D6] The composition of any one of X5], Z5], A6] or C6] above, wherein the composition comprises ≤99.9 wt %, or ≤99.8 wt %, or ≤99.6 wt %, or ≤99.4 wt %, or ≤99.2 wt % of the interpolymer, based on the weight of the composition.

E6] The composition of any one of Y5], Z5] or B6] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the derivative interpolymer, based on the weight of the composition.

F6] The composition of any one of Y5], Z5], B6] or E6] above, wherein the composition comprises ≤99.9 wt %, or ≤99.8 wt %, or ≤99.6 wt %, or ≤99.4 wt %, or ≤99.2 wt % of the derivative interpolymer, based on the weight of the composition.

G6] An article comprising at least one component formed from the composition of any one of X5]-F6] above.

H6] The article of G6] above, wherein the article is a film.

I6] The article of G6] above, wherein the article is a solar cell module, a cable, a footwear component, an automotive part, a window profile, a tire, a tube, or a roofing membrane.

J6] A process to prepare the ethylene/siloxane interpolymer of any one of A4]-V5] above, said process comprising polymerizing a mixture comprising ethylene, and optionally an alpha-olefin, and a siloxane monomer of Formula 2, in the presence of a catalyst system comprising a Group 3-10 metal complex; and wherein Formula 2 is as follows:

U-Si(A)(B)—O—(Si(C)(D)-O)$_y$—Si(E)(F)(H) (Formula 2), where U is an alkenyl group;

A is a hydrocarbyl group or hydrogen, B is a hydrocarbyl group or hydrogen, and A and B may be the same or different;

y≥0; C is a hydrocarbyl group or hydrogen, D is a hydrocarbyl group or hydrogen, and C and D may be the same or different, and where C may be the same or different across the number of y units, further the same across the number of y units, and where D may be the same or different across the number of y units, further the same across the number of y units;

E is a hydrocarbyl group or hydrogen, F is a hydrocarbyl group or hydrogen, and E and F may be the same or different; H is hydrogen.

K6] The process of J6] above, wherein the mixture further comprises a scavenger, and a Bronsted acid or a Lewis acid, and further a scavenger and a Bronsted acid.

L6] The process of J6] or K6] above, wherein the metal complex is selected from Formula A, as described herein.

M6] The process of J6] or K6] above, wherein the metal complex is selected from Formula B, as described herein.

N6] The process of any one of J6]-M6] above, wherein the polymerization has an efficiency ≥130,000, or ≥140,000, or ≥150,000 g polymer/g catalyst.

O6] The process of any one of J6]-N6] above, wherein the polymerization has an efficiency ≤410,000, or ≤400,000, or ≤390,000 polymer/g catalyst.

P6] The process of any one of J6]-O6] above, wherein the polymerization takes place at a temperature ≥90° C., or ≥95° C., or ≥100° C., or ≥105° C., or ≥110° C., or ≥115° C.

Q6] The process of any one of J6]-P6] above, wherein the polymerization takes place at a temperature ≤200° C., or ≤190° C., or ≤180° C., or ≤170° C., or ≤160° C., or ≤150° C., or ≤145° C., or ≤140° C., or ≤135° C., or ≤130° C., or ≤125° C.

R6] The process of any one of J6]-Q6] above, wherein the polymerization takes place at a pressure ≥90 psi, or ≥95 psi, or ≥100 psi, or ≥105 psi, or ≥110 psi.

S6] The process of any one of J6]-R6] above, wherein the polymerization takes place at a pressure ≤160 psi, or ≤155 psi, or ≤150 psi, or ≤145 psi, or ≤140 psi, or ≤135 psi, or ≤130 psi, or ≤125 psi.

A7] An ethylene/silane interpolymer comprising at least one chemical unit of Structure 3 as shown below:

(Structure 3)

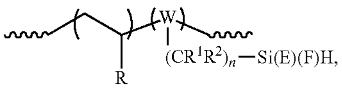

wherein n≥1; H is hydrogen; R is hydrogen or an alkyl, further hydrogen; —W— is a -(cyclic)- group;

each of $R^1$ and $R^2$ is independently hydrogen or a hydrocarbyl group, and $R^1$ and $R^2$ may be the same or different;

E is a hydrocarbyl group or hydrogen, F is a hydrocarbyl group or hydrogen, and E and F may be the same or different.

B7] The interpolymer of A7] above, wherein, for Structure 3, —W— is a -(bicyclic)- group, and further a -(bridged bicyclic)- group.

C7] The interpolymer of any one of A7] or B7] above, wherein, for Structure 3, —W— comprises 7 to 50 carbon atoms, or 7 to 40 carbon atoms, or 7 to 30 carbon atoms, or 7 to 20 carbon atoms.

D7] The interpolymer of any one of A7]-C7] above, wherein, for Structure 3, —W— is selected from structures w1 and w2 below, and where for each structure the notation "∿∿" refers to the point of attachment of the structure to the "$(CR^1R^2)_n$" of the remaining portion of the Structure 3 (described herein).

(w1)

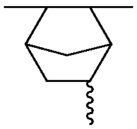

or (w2)

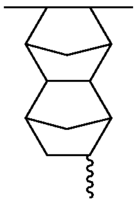

.

E7] The interpolymer of any one of A7]-D7] above, wherein, for Structure 3, E is an alkyl, further a C1-C5 alkyl, further a C1-C4 alkyl, further a C1-C3 alkyl, further a C1-C2 alkyl, further methyl.

F7] The interpolymer of any one of A7]-E7] above, wherein, for Structure 3, F is an alkyl, further a C1-C5 alkyl, further a C1-C4 alkyl, further a C1-C3 alkyl, further a C1-C2 alkyl, further methyl.

G7] The interpolymer of any one of A7]-F7] above, wherein Structure 3 is selected from the following Structure 3a or Structure 3a' below:

(Structure 3a)

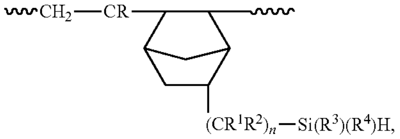

wherein R is hydrogen or an alkyl, further hydrogen; and each of $R^1$ and $R^2$ is independently hydrogen or an alkyl group, and $R^1$ and $R^2$ may the same or different, and further $R^1$ and $R^2$ are each hydrogen; and wherein each of $R^3$ and $R^4$ is independently an alkyl group, further a C1-C5 alkyl, further a C1-C4 alkyl, further a C1-C3 alkyl, further a C1-C2 alkyl, further methyl; and wherein $R^3$ and $R^4$ may the same or different; n is from 1 to 10, or 1 to 8, or 1 to 6, or 1 to 4, or 1 to 2, or 1; or (Structure 3a')

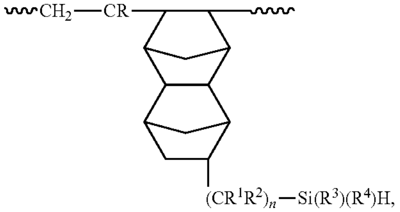

wherein R is hydrogen or an alkyl, further hydrogen; and each of $R^1$ and $R^2$ is independently hydrogen or an alkyl group, and $R^1$ and $R^2$ may the same or different, and further $R^1$ and $R^2$ are each hydrogen; and wherein each of $R^3$ and $R^4$ is independently an alkyl group, further a C1-C5 alkyl, further a C1-C4 alkyl, further a C1-C3 alkyl, further a C1-C2 alkyl, further methyl; and wherein $R^3$ and $R^4$ may the same or different; n is from 1 to 10, or 1 to 8, or 1 to 6, or 1 to 4, or 1 to 2, or 1.

H7] The interpolymer of any one of A7]-G7] above, wherein Structure 3 is selected from the following Structure 3b or Structure 3b' below:

(Structure 3b)

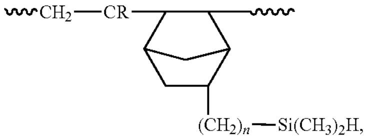

wherein R is hydrogen or an alkyl, further hydrogen; and n is from 1 to 10, or 1 to 8, or 1 to 6, or 1 to 4, or 1 to 2, or 1; or (Structure 3b')

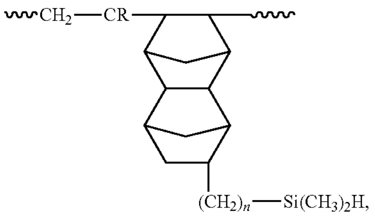

wherein R is hydrogen or an alkyl, further hydrogen; and n is from 1 to 10, or 1 to 8, or 1 to 6, or 1 to 4, or 1 to 2, or 1.

I7] The interpolymer of any one of A7]-H7] above, wherein the interpolymer further comprises, in polymerize form, an alpha-olefin.

J7] The interpolymer of 17] above, wherein the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

K7] The interpolymer of 17] or J7] above, wherein, the interpolymer comprises, in polymerized form, ≥3.0 mol %, or ≥4.0 mol %, or ≥5.0 mol %, or ≥6.0 mol %, or ≥7.0 mol % of the alpha-olefin, based on the total moles of polymerized monomers in the interpolymer.

L7] The interpolymer of any one of I7]-K7] above, wherein, the interpolymer comprises, in polymerized form, ≤25.0 mol %, or ≤20.0 mol %, or ≤18.0 mol %, or ≤16.0 mol % of the alpha-olefin, based on the total moles of polymerized monomers in the interpolymer.

M7] The interpolymer of any one of A7]-L7] above, wherein the polymerized silane monomer portion of Structure 3 is derived from a silane monomer, and wherein the interpolymer comprises, in polymerized form, ≥0.10 wt %, or ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of the silane monomer, based on the weight of the interpolymer.

N7] The interpolymer of any one of A7]-M7] above, wherein the polymerized silane monomer portion of Structure 3 is derived from a silane monomer, and wherein the interpolymer comprises, in polymerized form, ≤10 wt %, or ≤9.0 wt %, or ≤8.0 wt %, or ≤7.0 wt %, or ≤6.0 wt %, or ≤5.0 wt %, or ≤4.8 wt %, or ≤4.6 wt %, or ≤4.4 wt %, or ≤4.2 wt %, or ≤4.0 wt % of the silane monomer, based on the weight of the interpolymer.

O7] The interpolymer of any one of A7]-N7] above wherein the polymerized silane monomer portion of Structure 3 is derived from a silane monomer, and wherein the interpolymer comprises, in polymerized form, ≥0.10 mol %, or ≥0.12 mol %, or ≥0.15 mol %, or ≥0.17 mol %, or ≥0.19 mol % of the silane monomer, based on the total moles of polymerized monomers in the interpolymer.

P7] The interpolymer of any one of A7]-O7] above, wherein the polymerized silane monomer portion of Structure 3 is derived from a silane monomer, and wherein the interpolymer comprises, in polymerized form, ≤5.00 mol %, or ≤4.00 mol %, or ≤3.00, or ≤2.00 mol %, or ≤1.50 mol %, or ≤1.00 mol % of the silane monomer, based on the total moles of polymerized monomers in the interpolymer.

Q7] The interpolymer of any one of A7]-P7] above, wherein the interpolymer has a molecular weight distribution (MWD=Mw/Mn)≥1.80, or ≥1.90, or ≥2.00, or ≥2.10.

R7] The interpolymer of any one of A7]-Q7] above, wherein the interpolymer has a molecular weight distribution MWD≤5.00, or ≤4.80, or ≤4.60, or ≤4.40, or ≤4.20, or ≤4.00, or ≤3.80, or ≤3.50, or ≤3.20, or ≤3.00, or ≤2.90, or ≤2.80.

S7] The interpolymer of any one of A7]-R7] above, wherein the interpolymer has a number average molecular weight (Mn)≥2,000 g/mol, or ≥3,000 g/mol, or ≥4,000 g/mol, or ≥5,000 g/mol, or ≥5,500 g/mol.

T7] The interpolymer of any one of A7]-S7] above, wherein the interpolymer has a number average molecular weight (Mn)≤40,000 g/mol, or ≤35,000 g/mol, or ≤30,000 g/mol, or ≤25,000 g/mol, or ≤20,000 g/mol, or ≤15,000 g/mol.

U7] The interpolymer of any one of A7]-T7] above, wherein the interpolymer has a weight average molecular weight (Mw)≥8,000 g/mol, or ≥10,000 g/mol, or ≥11,000 g/mol, or ≥12,000 g/mol.

V7] The interpolymer of any one of A7]-U7] above, wherein the interpolymer has a weight average molecular weight (Mw)≤80,000 g/mol, or ≤70,000 g/mol, or ≤60,000 g/mol, or ≤50,000 g/mol.

W7] The interpolymer of any one of A7]-V7] above, wherein the interpolymer has a density ≥0.855 g/cc, or ≥0.856 g/cc, or ≥0.858 g/cc, or ≥0.860 g/cc, or ≥0.862 g/cc, or ≥ or ≥0.864 g/cc, or ≥0.866 g/cc (1 cc=1 $cm^3$).

X7] The interpolymer of any one of A7]-W7] above, wherein the interpolymer has a density ≤0.950 g/cc, or ≤0.920 g/cc, or ≤0.900 g/cc, or ≤0.890 g/cc, or ≤0.888 g/cc, or ≤0.886 g/cc, or ≤0.884 g/cc, or ≤0.882 g/cc, or ≤0.880 g/cc, or ≤0.878 g/cc, or ≤0.876 g/cc.

Y7] The interpolymer of any one of A7]-X7] above, wherein the interpolymer has a melt index (I2)≥0.5 dg/min, or ≥1.0 dg/min, or ≥2.0 dg/min, or ≥5.0 dg/min, or ≥10 dg/min.

Z7] The interpolymer of any one of A7]-Y7] above, wherein the interpolymer has a melt index (I2)≤1,000 dg/min, or ≤500 dg/min, or ≤250 dg/min, or ≤100 dg/min, or ≤50 dg/min, or ≤20 dg/min.

A8] The interpolymer of any one of A7]-Z7] above, wherein the interpolymer of has a melting temperature ($T_m$)≥90° C., or ≥100° C., or ≥105° C., or ≥110° C., or ≥115° C., or ≥120° C.

B8] The interpolymer of any one of A7]-A8] above, wherein the interpolymer has a melting temperature ($T_m$)≤150° C., or ≤145° C., or ≤140° C., or ≤135° C., or ≤130° C.

C8] A derivative of the interpolymer any one of A7]-B8] above, wherein the derivative is formed by one or more subsequent siloxane conversion processes selected from the group consisting of a)-e) below:

a) coupling of one or more chains of the interpolymer;

b) hydrolysis, alcoholysis, oxidation, or aminolysis to give Si—$OR^4$ or Si—$NR^4_2$ groups, where $R^4$ is H or a $C_1$-$C_{10}$ hydrocarbyl;

c) hydrolysis and neutralization to give ionomers having Si—$OR^6$ groups, where $R^6$ is a metal cation;

d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups; and e) modification through hydrosilylation or a Piers Rubinsztajn reaction.

D8] A composition comprising the interpolymer any one of A7]-B8] above, and at least one additive.

E8] A composition comprising the derivative interpolymer of C8] above, and at least one additive.

F8] The composition of D8] or E8] above, wherein the additive is selected from an antioxidant, a filler, an oil, or combinations thereof.

G8] The composition of D8] or F8] above, wherein the composition further comprises a thermoplastic polymer, different from the interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

H8] The composition of E8] or F8] above, wherein the composition further comprises a thermoplastic polymer, different from the derivative interpolymer in one or more features, such as monomer(s) types and/or amounts, Tm, melt index (I2), Mn, Mw, MWD, or any combination thereof, and further, in one or more features, such as monomer(s) types and/or amounts, Mn, Mw, MWD, or any combination thereof.

I8] The composition of any one of D8], F8] or G8] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the interpolymer, based on the weight of the composition.

J8] The composition of any one of D8], F8], G8] od I8] above, wherein the composition comprises ≤99.9 wt %, or ≤99.8 wt %, or ≤99.6 wt %, or ≤99.4 wt %, or ≤99.2 wt % of the interpolymer, based on the weight of the composition.

K8] The composition of any one of E8], F8] or H8] above, wherein the composition comprises ≥40.0 wt %, or ≥45.0 wt %, or ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥95.0 wt %, or ≥96.0 wt %, or ≥97.0 wt %, or ≥98.0 wt %, or ≥99.0 wt % of the derivative interpolymer, based on the weight of the composition.

L8] The composition of any one of E8], F8], H8] or K8] above, wherein the composition comprises ≤99.9 wt %, or ≤99.8 wt %, or ≤99.6 wt %, or ≤99.4 wt %, or ≤99.2 wt % of the derivative interpolymer, based on the weight of the composition.

M8] An article comprising at least one component formed from the composition of any one of D8]-L8] above.

N8] The article of M8] above, wherein the article is a film.

O8] The article of M8] above, wherein the article is a solar cell module, a cable, a footwear component, an automotive part, a window profile, a tire, a tube, or a roofing membrane.

P8] A process to prepare the ethylene/silane interpolymer any one of A7]-B8] above, said process comprising polymerizing a mixture comprising ethylene, and optionally an alpha-olefin, and a silane monomer of Formula 3, in the presence of a catalyst system comprising a Group 3-10 metal complex; and wherein Formula 3 is as follows:

$$W—Si\text{-}EFH \quad \text{(Formula 3)},$$

where W is a cyclic alkenyl group;

E is a hydrocarbyl group or hydrogen, F is a hydrocarbyl group or hydrogen, and E and F may be the same or different; and H is hydrogen (H).

Q8] The process of P8] above, wherein for Formula 3, W is a bicyclic alkenyl group, and further a bridged bicyclic alkenyl group.

R8] The process of P8] or Q8] above, wherein the mixture further comprises a scavenger, and a Bronsted acid or a Lewis acid, and further a scavenger and a Bronsted acid.

S8] The process of any one of P8]-R8] above, wherein the metal complex is selected from Formula A, as described herein.

T8] The process of any one of P8]-R8] above, wherein the metal complex is selected from Formula B, as described herein.

U8] The process any one of P8]-T8] above, wherein the polymerization has an efficiency ≥230,000, or ≥240,000, or ≥250,000 g polymer/g catalyst.

V8] The process of any one of P8]-U8] above, wherein the polymerization has an efficiency ≤1,100,000, or ≤1,000,000, or ≤950,000 g polymer/g catalyst.

W8] The process of any one of P8]-V8] above, wherein the polymerization takes place at a temperature ≥90° C., or ≥95° C., or ≥100° C., or ≥105° C., or ≥110° C., or ≥115° C.

X8] The process of any one of P8]-W8] above, wherein the polymerization takes place at a temperature ≤200° C., or ≤190° C., or ≤180° C., or ≤170° C., or ≤160° C., or ≤150° C., or ≤145° C., or ≤140° C., or ≤135° C., or ≤130° C., or ≤125° C.

Y8] The process of any one of P8]-X8] above, wherein the polymerization takes place at a pressure ≥90 psi, or ≥95 psi, or ≥100 psi, or ≥105 psi, or ≥110 psi.

Z8] The process of any one of P8]-X8] above, wherein the polymerization takes place at a pressure ≤160 psi, or ≤155 psi, or ≤150 psi, or ≤145 psi, or ≤140 psi, or ≤135 psi, or ≤130 psi, or ≤125 psi.

A9] An ethylene/silane interpolymer prepared the process of any one of P8]-Z8] above.

A10] A process to form an interpolymer, which comprises, in polymerized form, at least one siloxane monomer, or at least one silane monomer without a siloxane linkage, said process comprising polymerizing a mixture comprising one or more "addition polymerizable monomers" and at least one monomer of Formula 4, in the presence of a catalyst system comprising a metal complex selected from Formula A, as described herein, or Formula B, as described herein, and wherein Formula 4 is as follows:

$$A_a\text{-}(Si(B_b)(C_c)(H_{h0})—O)_x—(Si(D_d)(E_e)(H_{h1})—O)_y—Si(F_f)(G_g)(H_{h2}) \quad \text{(Formula 4)},$$

where A is an alkenyl group, H is hydrogen;

B is a hydrocarbyl group, C is a hydrocarbyl group, and where B and C may be the same or different, and where B and may be the same or different across the number of x units, further the same across the number of x units, and where C may be the same or different across the number of x units, further the same across the number of x units;

D is a hydrocarbyl group, E is a hydrocarbyl group, and where D and E may be the same or different, and where D and may be the same or different across the number of y units, further the same across the number of y units, and where E may be the same or different across the number of y units, further the same across the number of y units;

F is a hydrocarbyl group, G is a hydrocarbyl group, and where F and G may be the same or different;

x=0 or 1, and when x=0, then y=0, and a=1 or 2, h2=1 or 2, f=0, 1 or 2, g=0, 1 or 2, and a+f+g+h2=4;

when x=1, then y 0, and a=1 or 2, b=0, 1 or 2, c=0, 1 or 2, h0=0, 1 or 2, d=0, 1 or 2, e=0, 1 or 2, h1=0, 1 or 2, f=0, 1 or 2, g=0, 1 or 2, h2=1 or 2, and a+b+c+h0=3, d+e+h1=2, and f+g+h2=3.

B10] The process of A10] above, wherein the interpolymer is an olefin-based interpolymer, and further an ethylene-based interpolymer.

C10] The process of A10] or B10] above, wherein the mixture further comprises a scavenger, and a Bronsted acid or a Lewis acid, and further a scavenger and a Bronsted acid.

D10] The process of any one of A10]-C10] above, wherein the one or more “addition polymerizable monomers” comprise ethylene and/or an alpha-olefin, and further ethylene and an alpha-olefin.

E10] The process of any one of A10]-D10] above, wherein the polymerization has an efficiency ≥130,000, or ≥140,000, or ≥150,000, or ≥160,000, or ≥180,000, or ≥200,000, or ≥220,000, or ≥240,000, or ≥250,000 g polymer/g catalyst.

F10] The process of any one of A10]-E10] above, wherein the polymerization has an efficiency ≤1,100,000, or ≤1,000,000, or ≤950,000 g polymer/g catalyst.

G10] The process of any one of A10]-F10] above, wherein the polymerization takes place at a temperature ≥90° C., or ≥95° C., or ≥100° C., or ≥105° C., or ≥110° C., or ≥115° C.

H10] The process of any one of A10]-G10] above, wherein the polymerization takes place at a temperature ≤200° C., or ≤190° C., or ≤180° C., or ≤170° C., or ≤160° C., or ≤150° C., or ≤145° C., or ≤140° C., or ≤135° C., or ≤130° C., or ≤125° C.

I10] The process of any one of A10]-H10] above, wherein the polymerization takes place at a pressure ≥90 psi, or ≥95 psi, or ≥100 psi, or ≥105 psi, or ≥110 psi.

J10] The process of any one of A10]-I10] above, wherein the polymerization takes place at a pressure ≤160 psi, or ≤155 psi, or ≤150 psi, or ≤145 psi, or ≤140 psi, or ≤135 psi, or ≤30 psi, or ≤125 psi.

K10] The process of any one of A10]-J10] above, wherein x=1.

L10] The process of K10], wherein the interpolymer is an olefin/siloxane interpolymer, and further an ethylene/siloxane interpolymer.

M10] The process of K10] or L10], wherein the interpolymer is an ethylene/alpha-olefin/-siloxane interpolymer.

N10] The process of M10], wherein the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

O10] The process of any one of A10]-J10] above, wherein x=0.

P10] The process of 010], wherein the interpolymer is an olefin/silane interpolymer, and further an ethylene/silane interpolymer.

Q10] The process of 010] or P10], wherein the interpolymer is an ethylene/alpha-olefin/silane interpolymer.

R10] The process of Q10], wherein the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

S10] The process of any one of A10]-R10] above, wherein the metal complex is selected from Formula A.

T10] The process of S10] above, wherein, for Formula A, n=2, and each X is an alkyl, further a C1-C5 alkyl, further a C1-C4 alkyl, further a C1-C3 alkyl, further a C1-C2 alkyl, further methyl.

U10] The process of S10] or T10] above, wherein, for Formula A, each Z is oxygen.

V10] The process of any one of S10]-U10] above, wherein, for Formula A, L is an alkylene, further a C2-C5 alkylene, further a C3-C4 alkylene, further a C3 alkylene.

W10] The process of any one of S10]-V10] above, wherein, for Formula A, $R^{3a}$ and $R^{3b}$ are each a halo group or an alkyl group, and further F or a C1-C4 alkyl.

X10] The process of any one of S10]-W10] above, wherein, for Formula A, $R^{70}$ and $R^{7d}$ are each an alkyl, and further a C1-C8 alkyl.

Y10] The process of any one of A10]-R10] above, wherein the metal complex is selected from Formula B.

Z10] The process of Y10] above, where the metal complex is selected from Formula B, as shown below:

(Formula B1)

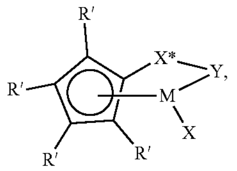

wherein each R' is independently selected from hydrogen, hydrocarbyl, silyl, germyl, cyano, halo and combinations thereof, said R' having up to 20 non-hydrogen atoms, and optionally two R' groups (when R' is not hydrogen, halo or cyano) together form a divalent derivative thereof connected to adjacent positions of the, cyclopentadienyl ring to form a fused ring structure;

X is a neutral $\eta^4$-bonded diene group having up to 30 non-hydrogen atoms, which forms a π-complex with M;

Y is —O—, —S—, —NR*—, —PR*—;

M is titanium or zirconium in the +2 formal oxidation state;

Z is $SiR^*_2$, $CR^*_2$, $SiR^*_2SiR^*_2$, $CR^*_2CR^*_2$, $CR^*{=}CR^*$, $CR^*_2SiR^*_2$, or $GeR^*_2$, wherein each R* is independently hydrogen, or a member selected from hydrocarbyl, silyl, halogenated alkyl, halogenated aryl, and combinations thereof, said R* having up to 10 non-hydrogen atoms, and optionally, two R* groups from Z*, or an R* group from Z* and an R* group from Y (when R* is not hydrogen) form a ring system. Note, Z of Formula B comprises Z* and Y of Formula B1.

A11] The process of Y10] or Z10] above, wherein for Formula B, X is a conjugated diene.

B11] The process of any one of Y10]-A11] above, wherein for Formula B, Z comprises $SiR_2$, where each R is independently an alkyl, further each R is the same alkyl, further methyl.

C11] The process of any one of Y10]-B11] above, wherein for Formula B, Z comprises NR", where R" is an alkyl, further a C1-C4 alkyl, further tert-butyl.

D11] The process of any one of Y10]-C11] above, wherein for Formula B, each R' is independently an alkyl, further a C1-C4 alkyl, further each R' is the same alkyl, further each R' is methyl.

E11] The process of any one of Y10]-D11] above, wherein for Formula 4, A is a cyclic alkenyl group.

F11] The process of any one of Y10]-E11] above, wherein for Formula 4, A is a bicyclic alkenyl group, and further a bridged bicyclic alkenyl group.

G11] An interpolymer prepared the process of any one of A10]-F11] above.

Test Methods

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 1600 Celsius, and the column compartment was set at 150° Celsius. The columns were four AGILENT "Mixed A" 30 cm, 20-micron linear mixed-bed columns. The chromatographic solvent was 1,2,4-trichloro-benzene, which contained "200 ppm" of butylated hydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards were dissolved at 80 degrees Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^{B} \quad \text{(EQ1)},$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw. The total plate count of the GPC column set was performed with decane (prepared at "0.04 g in 50 milliliters" of TCB, and dissolved for 20 minutes with gentle agitation). The plate count (Equation 2) and symmetry (Equation 3) were measured on a "200 microliter injection" according to the following equations:

$$\text{Plate Count} = 5.54 * \left(\frac{(RV_{Peak\ Max}}{\text{Peak Width at } \frac{1}{2} \text{ height}}\right)^2, \quad \text{(EQ2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQ3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at "2 mg/ml," and the solvent (contained 200 ppm BHT) was added to a pre nitrogen-sparged, septa-capped vial, via the PolymerChar high temperature autosampler. The samples were dissolved for two hours at 1600 Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using the PolymerChar GPCOne™ Software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum^{i} IR_i}{\sum^{i} (IR_i / M_{polyethylene_i})}, \quad \text{(Eq 4)}$$

$$Mw_{(GPC)} = \frac{\sum^{i} (IR_i * M_{polyethylene_i})}{\sum^{i} IR_i}, \text{ and} \quad \text{(EQ 5)}$$

$$Mz_{(GPC)} = \frac{\sum^{i} (IR_i * M^2_{polyethylene_i})}{\sum^{i} (IR_i * M_{polyethylene_i})}. \quad \text{(EQ 6)}$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation 7: Flowrate(effective)=Flowrate (nominal)*(RV(FM Calibrated)/RV(FM Sample)) (EQ7). Processing of the flow marker peak was done via the PolymerChar GPCOne™ Software. Acceptable flowrate correction is such that the effective flowrate should be within +/−0.7% of the nominal flowrate.

Melt Index

The melt index (I2) of an ethylene-based polymer is measured in accordance with ASTM D-1238, condition 190° C./2.16 kg. The melt flow rate (MFR) of a propylene-based polymer is measured in accordance with ASTM D-1238, condition 230° C./2.16 kg.

Density

ASTM D4703 is used to make a polymer plaque for density analysis. ASTM D792, Method B, is used to measure the density of the polymer.

NMR Characterization of Terpolymers

For $^{13}C$ NMR experiments, each sample was dissolved, in 10 mm NMR tubes, in tetrachloroethane-$d_2$ (with or without 0.025 M $Cr(acac)_3$). The concentration was approximately "300 mg/2.8 mL." Each tube was then heated in a heating block set at 110° C.

The sample tube was repeatedly vortexed and heated to achieve a homogeneous flowing fluid. The $^{13}C$ NMR spectrum was taken on a BRUKER AVANCE 600 MHz spectrometer, equipped with a 10 mm C/H DUAL cryoprobe. The following acquisition parameters were used: 60 seconds relaxation delay, 90 degree pulse of 12.0 μs, 256 scans. The spectrum was centered at "100 ppm," with a spectral width of 250 ppm. All measurements were taken without sample spinning at 110° C. The $^{13}C$ NMR spectrum was referenced to "74.5 ppm" for the resonance peak of the solvent. For a sample with Cr, the data was taken with a "7 seconds relaxation delay" and 1024 scans. The "mol % siloxane" or "mol % silane" was calculated based on the integration of SiMe carbon resonances, versus the integration of CH2 carbons associated with ethylene units, and CH/CH3 carbons associated with octene units. The "mol % octene (or other alpha-olefin)" was similarly calculated with reference to the CH/CH3 carbons associated with octene (or other alpha-olefin).

For $^{1}H$ NMR experiments, each sample was dissolved, in 8 mm NMR tubes, in tetrachloroethane-$d_2$ (with or without 0.001 M $Cr(acac)_3$). The concentration was approximately "100 mg/1.8 mL." Each tube was then heated in a heating block set at 110° C. The sample tube was repeatedly vortexed and heated to achieve a homogeneous flowing fluid. The $^{1}H$ NMR spectrum was taken on a BRUKER AVANCE 600 MHz spectrometer, equipped with a 10 mm C/H DUAL cryoprobe. A standard single pulse, $^{1}H$ NMR experiment was performed. The following acquisition parameters were used: 70 seconds relaxation delay, 90 degree pulse of 17.2 μs, 32 scans. The spectrum was centered at "1.3 ppm," with a spectral width of 20 ppm. All measurements were taken, without sample spinning, at 110° C. The $^{1}H$ NMR spectrum was referenced to "5.99 ppm" for the resonance peak of the solvent (residual protonated tetrachloroethane). For a sample with Cr, the data was taken with a "16 seconds relaxation delay" and 128 scans. The "mol % siloxane" or "mol % silane" was calculated based on the integration of SiMe proton resonances, versus the integration of CH2 protons associated with ethylene units, and CH3 protons associated with octene units. The "mol % octene (or other alpha-olefin)" was similarly calculated with reference to the CH3 protons associated with octene (or other alpha-olefin).

Differential Scanning Calorimetry (DSC)

Differential Scanning Calorimetry (DSC) is used to measure Tm, Tc, Tg and crystallinity in ethylene-based (PE) polymer samples and propylene-based (PP) polymer samples. About 5 to 8 mg of polymer sample was weighed and placed in a DSC pan. The lid was crimped on the pan to ensure a closed atmosphere. Unless otherwise stated, the sample pan was placed in a DSC cell, and then heated, at a rate of 10° C./min, to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). Unless otherwise stated, melting point ($T_m$) and the glass transition temperature ($T_g$) of each polymer were determined from the second heat curve, and the crystallization temperature ($T_c$) was determined from the first cooling curve. The $T_m$ (peak temperature) and the $T_g$ were recorded. The percent crystallinity can be calculated by dividing the heat of fusion ($H_f$), determined from the second heat curve, by a theoretical heat of fusion of 292 J/g for PE (165 J/g for PP), and multiplying this quantity by 100 (for example, % cryst.=($H_f$/292 J/g)×100 (for PE)).

EXPERIMENTAL

I. Siloxanes

Synthesis of 1-(hex-5-en-1-yl)-1,1,3,3-tetramethyldisiloxane (HexMMH)

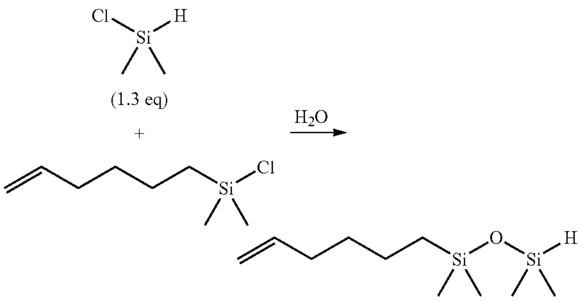

A 1 L, three-neck RB flask was equipped with a water-cooled condenser, a thermocouple wire, a dropping funnel, and a large magnetic stir bar. The top of the condenser was capped with an adapter, connected to a bottle containing 30 wt % of aq. NaOH solution, with tubing, to neutralize any released HCl. Deionized water (183 gram) was added to the flask, then the flask and contents were cooled with an ice-bath to ≤5° C. A mixture of hexenyl-dimethylchlorosilane (200 gram, 1.0 equiv.) and dimethylchlorosilane (139 gram, 1.3 equiv.) was added to the dropping funnel. This mixture was slowly added to the flask, while maintaining the internal temperature of the reaction mixture in the flask at ≤20° C. After the addition, the ice-bath was removed, and the reaction mixture was stirred for 1.5 hours at room temperature. The organic phase (top layer) was separated, washed thoroughly with sat. aq. $NaHCO_3$ (200 ml×3), deionized water (200 ml×1), and dried over $MgSO_4$. After filtration, the crude product was obtained as colorless clear liquid (244 gram). The crude was purified by vacuum distillation (81-84° C., 20 Torr) to give the pure product as a clear colorless liquid (185 gram, 76% yield). $^{1}H$ NMR ($CDCl_3$, 400 MHz): 5.80 (m, 1H), 5.94 (m, 2H), 4.68 (m, 1H), 2.06 (m, 2H), 1.39 (m, 2H), 0.54 (m, 2H), 0.16 (s, 3H), 0.15 (s, 3H), 0.06 (s, 6H); $^{13}C$ NMR ($CDCl_3$, 100 MHz): 139.0, 114.1, 33.5, 32.5, 22.7, 17.9, 0.9, 0 ppm; $^{29}Si$ NMR ($CDCl_3$, 79 MHz): 9.8, −6.8 ppm.

Synthesis of ethylene-co-1-octene-co-1-(hex-5-en-]-yl)-1,1,3,3-tetramethyldisiloxane terpolymers Batch reactor polymerizations were conducted in a "2 L PARR" batch reactor. The reactor was heated by an electrical heating mantle, and cooled by an internal serpentine cooling coil containing cooling water. Both the reactor and the heating/cooling system were controlled and monitored by a process computer. The bottom of the reactor was fitted with a dump valve, which emptied the reactor contents into a stainless steel dump pot, which was prefilled with a catalyst kill solution (typically 5 mL of a IRGAFOS/IRGANOX/toluene mixture). The dump pot was vented to a 30 gallon, blow-down tank, with both the pot and the tank purged with nitrogen. The polymerization solvents, the monomers, and the catalyst makeup were run through purification columns to remove any impurities that may affect polymerization. Note, ISOPAR E is an isoparaffin fluid, typically containing less than 1 ppm benzene and less than 1 ppm sulfur, and is commercially available from ExxonMobil Chemical Company. The $N_2$, used for transfers, was also passed through a purification column. The reactor was loaded first from a shot tank that may contain ISOPAR-E solvent and/or 1-octene, depending on desired reactor load. The shot tank was filled to the load set points. The desired amount of hydrocarbylsiloxane monomer was added via the shot tank. After a liquid feed addition, the reactor was heated to the polymerization temperature set point. If ethylene was used, it was added to the reactor, when at reaction temperature, to maintain reaction pressure set point. Ethylene addition amounts were monitored by a flow meter.

The procatalyst (catalyst) and activators were mixed with the appropriate amount of purified toluene to achieve a desired molarity solution. The catalyst and activators were handled in an inert glove box, drawn into a syringe, and pressure transferred into a catalyst shot tank. This was followed by three rinses of toluene, 5 mL each. Immediately after the catalyst addition, the run timer began. If ethylene was used, it was then added by the process computer to maintain reaction pressure set point in the reactor. These polymerizations were run for ten minutes, then the agitator was stopped, and the bottom dump valve opened to empty reactor contents to the dump pot. The dump pot contents were poured into trays, which were placed in a lab hood, where the solvent was evaporated overnight. The trays containing the remaining polymer were then transferred to a vacuum oven, where they were heated to 140° C., under vacuum, to remove any remaining solvent. After the trays cooled to ambient temperature, the polymers were weighed for yield/efficiencies, and submitted for polymer characterization.

Polymers were prepared following the batch reactor process using the conditions shown in Tables 2A and 2B below. The amount of procatalyst was adjusted to reach a desired efficiency. The reactor pressure and temperature were kept constant, by feeding ethylene during the polymerization and cooling the reactor as needed. All reactions were run for ten minutes. All polymerizations were performed with bis(hydrogenated tallow alkyl)methylammonium tetrakis(pentafluorophenyl)borate (Bronsted acid) as the activator, and MMAO as the scavenger. Polymer properties are shown in Table 1.

TABLE 1

Interpolymer Properties

| | Tg | Tm | Mn | Mw | Mw/Mn | Octene 1H NMR* | 1H NMR* (Incorporation of siloxane monomer) | |
|---|---|---|---|---|---|---|---|---|
| Ex. | Deg C. | Deg C. | g/mol | g/mol | — | mol % | mol % | wt % |
| C1 | −61.5 | 60.4 | 16017 | 36578 | 2.28 | 13.8 | — | — |
| 1 | −48.2 | 85.4 | 26108 | 61610 | 2.36 | 8.1** | 0.37** | 2.2** |
| 2 | −60.0 | 63.5 | 21242 | 48582 | 2.29 | 10.5** | 0.42** | 2.4** |
| 3 | −61.1 | 61.1 | 18357 | 42150 | 2.30 | 14.9** | 0.75** | 4.0** |
| C2 | −35.2 | 92.0 | 423842 | 955351 | 2.25 | 5.2 | — | — |
| 4 | | 82.1 | 504919 | 1035378 | 2.05 | 7.3 | 0.19 | 1 |
| 5 | −48.2 | 79.4 | 404766 | 892470 | 2.20 | 8.2 | 0.46 | 2.3 |
| C3 | −58.2 | 45.4 | 452135 | 1059868 | 2.34 | 15 | — | — |
| 6 | −58.4 | 51.2 | 372643 | 931683 | 2.50 | 12.7 | 0.32 | 1.4 |
| 7 | −57.4 | 43.6 | 352373 | 958762 | 2.72 | 13.9 | 0.35 | 1.5 |
| 8 | −56.5 | 50.4 | 365829 | 839940 | 2.30 | 12.8 | 0.71 | 3.1 |

*$^1$H NMR spectroscopy: mol % based on total moles of polymerized monomers in terpolymer; wt % based on weight of the terpolymer.

**Incorporation measured by $^{13}$C NMR spectroscopy, and mol % based on total moles of polymerized monomers in terpolymer; wt % based on weight of the terpolymer.

Study—Comparing the reactivity of —$OSiMe_2H$ vs —$CH_2SiMe_2H$

In a dry/N2 glovebox, a reaction mixture in ds-toluene was generated, which contained either $HSiMe_2Bu$ (0.014 M) or $HSiMe_2OSiMe_3$ (0.012 M), and $ViSiMe_2OSiMe_3$ (0.015 M), and Pt ($1.5\times10^{-5}$ M) in the form of Karstedt's catalyst (Sigma Aldrich). This solution (0.7 mL total volume) was loaded into an NMR tube, and sealed with a cap and electrical tape. The NMR tube was then inserted into a rapidly stirred silicone oil bath, preheated to 80° C., and removed for the indicated time points shown in Table 3. Analysis was performed using $^1$H NMR (room temp.), integrating the Si—H and Si-Vi resonances for the Si—H and Si-Vi reagents. For the products, the anti-Markovnikov hydrosilylation products were the major products, and quantified as follows: integrating the Si methylene for $Me_3SiOSiMe_2(CH_2)_2$—SiMe2OSiMe3, and the methyl peaks of $BuMe_2Si(CH_2)_2SiMe_2O$—$SiMe_3$. It was discovered that the ~$RSiMe_2OSiMe_2H$ functionality undergoes hydrosilylation with Pt catalyst more rapidly and efficiently than the ~$SiMe_2H$ functionality.

TABLE 2A

| Polymerization Conditions | | | | | | | | | | | |
|---|---|---|---|---|---|---|---|---|---|---|---|
| Ex. | Cat. | Catalyst Loading μmol | Siloxane Monomer | Siloxane Added mL | Efficiency g polymer/ g catalyst | Reaction Temp. ° C. | Reactor Pressure psig | ISOPARE g | C8* g | Activator μmol | Scavenger μmol |
| C1 | CAT A | 0.50 | — | 0 | 914787 | 120 | 113.7 | 578.8 | 23.4 | 0.60 | 10 |
| 1 | CAT A | 1.50 | HexMMH | 2 | 293790 | 120 | 142.3 | 574.9 | 25.8 | 1.80 | 10 |
| 2 | CAT A | 1.25 | HexMMH | 2 | 250627 | 120 | 114.2 | 584.1 | 19.7 | 1.50 | 10 |
| 3 | CAT A | 2.15 | HexMMH | 4 | 189427 | 120 | 128.3 | 586.5 | 20.1 | 2.58 | 10 |
| C2 | CAT B | 0.50 | — | 0 | 225818 | 120 | 195.0 | 584.8 | 22.2 | 0.60 | 10 |
| 4 | CAT B | 0.70 | HexMMH | 2 | 195750 | 120 | 114.0 | 583.3 | 16.7 | 0.84 | 10 |
| 5 | CAT B | 0.90 | HexMMH | 4 | 161994 | 120 | 113.7 | 582.3 | 19.0 | 1.08 | 10 |
| C3 | CAT C | 0.10 | — | 0 | 1002857 | 120 | 117.0 | 581.8 | 23.1 | 0.12 | 10 |
| 6 | CAT C | 0.17 | HexMMH | 2 | 369109 | 120 | 135.1 | 581.0 | 24.7 | 0.20 | 10 |
| 7 | CAT C | 0.20 | HexMMH | 2 | 380974 | 120 | 115.5 | 586.8 | 25.3 | 0.24 | 10 |
| 8 | CAT C | 0.25 | HexMMH | 4 | 203933 | 120 | 116.0 | 585.2 | 22.0 | 0.30 | 10 |

*C8 = 1-octene

TABLE 2B

| Catalysts |
|---|
| CAT A (WO1995/000526) |
| 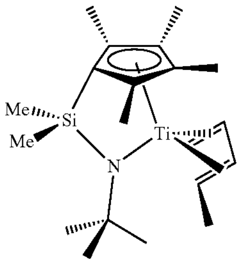 |
| CAT B (WO2007/136496) |
| 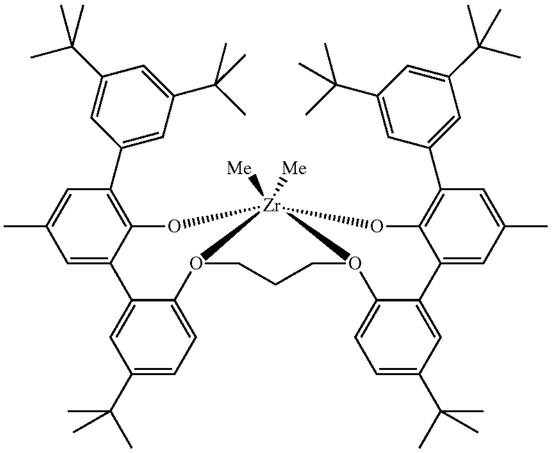 |
| CAT C (WO2012/027448) |

TABLE 2B-continued

Catalysts

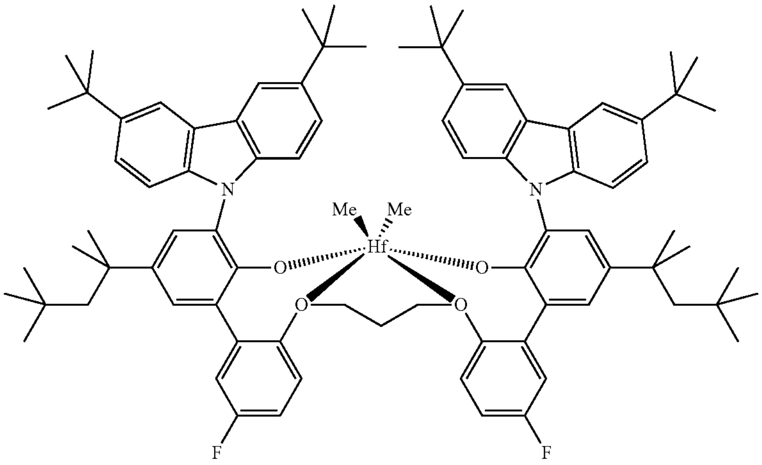

TABLE 3

| HSiMe$_2$Bu and ViSiMe$_2$OSiMe$_3$ | | | HSiMe$_2$OSiMe$_3$ and ViSiMe$_2$OSiMe$_3$ | | |
|---|---|---|---|---|---|
| Time (min) | BuMH (mol/L) | BuM(CH$_2$)$_2$MM (mol/L) | Time (min) | MMH (mol/L) | MM(CH$_2$)$_2$MM (mol/L) |
| 0 | 0.01395 | 0.00045 | 0 | 0.0123 | 0 |
| 2 | 0.0108 | 0.00090 | 2 | 0.0093 | 0.00165 |
| 5 | 0.00525 | 0.00555 | 5 | 0.0009 | 0.00960 |
| 9 | 0.00450 | 0.00555 | 9 | 0 | 0.00975 |
| 16 | 0.00435 | 0.0057 | 16 | 0.00015 | 0.00915 |
| 40 | 0.00405 | 0.00645 | 40 | 0.00015 | 0.01005 |

Functionalization of ethylene-co-1-octene-co-1-(hex-5-en-]-yl)-1,1,3,3-tetramethyldisiloxane terpolymer with vinylpentamethyldisiloxane Si—PO Terpolymer (Mn=21.2 kDa, 2.4 wt % HexMMH, Ex. 2)

Figure 2:
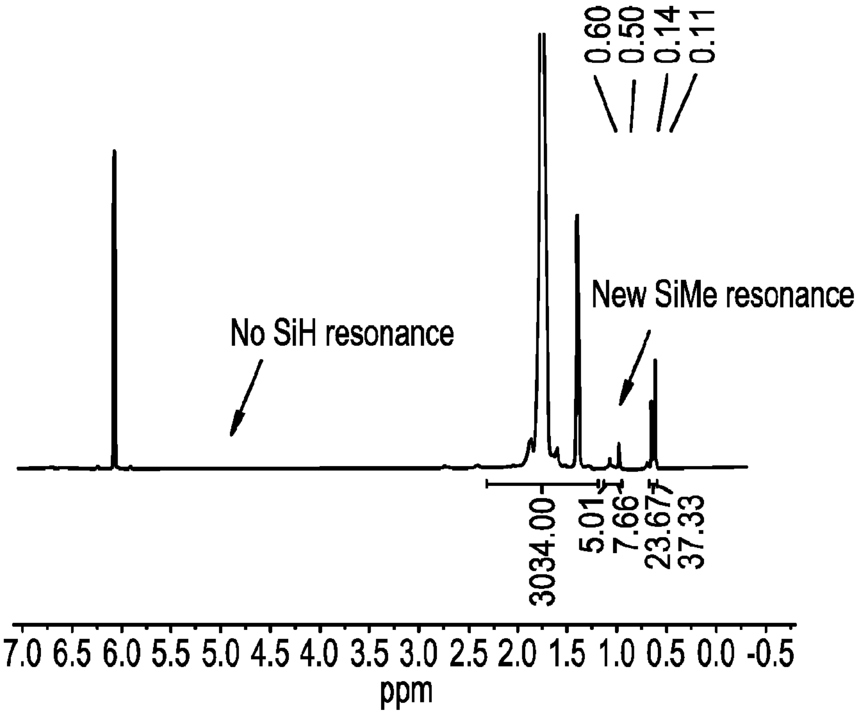
FIG. 2 depicts the 1H NMR spectrum of an ethylene-co-1-octene-co-1-(hex-5-en-1-yl)-1,1,3,3-tetramethyldisiloxane terpolymer after functionalization with the vinylpentamethyldisiloxane

In a dry/$N_2$ atmosphere glovebox, the "OSiMe2H" terpolymer (800 mg, 0.089 mmol SiH) and vinylpentamethyldisiloxane (46 mg, 0.27 mmol) were dissolved in toluene (3 mL) in a 2 dram vial at 100° C. Wilkinson's catalyst (0.004 mmol; chloridotris(triphenyl-phosphine)-rhodium(I), CAS Number: 14694-95-2) was added as a 5 mg/mL stock solution in toluene, and the pale orange reaction was stirred for three hours. The solution was removed from the glovebox, and precipitated into 100 mL of rapidly stirred methanol, and subsequently filtered, to yield 427 mg of a gummy white solid. Analysis performed by $^1$H NMR (TCE-d$_2$, 110° C.) spectroscopy revealed the complete consumption of the Si—H resonance at 4.75 ppm, and the emergence of a peak at 0.5 ppm, corresponding to the —SiMe$_2$-CH$_2$CH$_2$—SiMe$_2$- bridge, formed as a product of hydrosilylation. See FIGS. 1 and 2.

GPC data of the ethylene-co-1-octene-co-1-(hex-5-en-1-yl)-1,1,3,3-tetramethyldisiloxane terpolymer with vinylpentamethyldisiloxane, before, and after, functionalization with vinylpentamethyldisiloxane, are shown in Tables 4. The GPC analysis showed a slight increase in the Mp (MW at peak max), which can be attributed to the formation of a new Si—O—Si bond and a small increase in polymer molecular weight. The Mv, Mw, Mz and PDI (Mw/Mn) also increased.

TABLE 4

| GPC Results Before Functionalization | | | |
|---|---|---|---|
| Before Functionalization | | After Functionalization | |
| Mn | 21,242 | Mn | 21,180 |
| Mp | 40,920 | Mp | 41,880 |
| Mv | 44,680 | Mv | 48,900 |
| Mw | 48,580 | Mw | 54,120 |
| Mz | 86,900 | Mz | 110,380 |
| PDI | 2.29 | PDI | 2.56 |

II. Cyclic Silanes and Cyclic Siloxanes

Synthesis of 5-norbornen-2-yl(ethyl)dimethylsilane

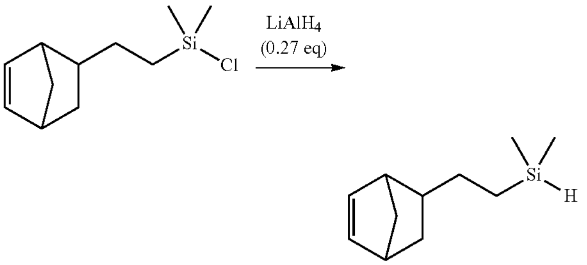

To a 100 ml glass bottle, containing a magnetic stir bar, was added cold, 5-norbornen-2-yl(ethyl)chlorodimethylsilane (95% purity, 50 gram, 0.23 mol, 1 equiv.; and stored at −20° C. fridge in the glovebox) in a dry, N2 atmosphere glovebox. To this cold liquid, was slowly added LiAlH$_4$ (4M in Et$_2$O, 16 mL, 64.0 mmol, 0.27 equiv.). A white precipitate rapidly formed, and the internal temperature slowly increased to approx. 50° C. After addition, the mixture was stirred at room temperature for two hours. The top layer (clear liquid) was isolated with a pipet (approx. 44 gram, almost pure product by $^1$H NMR). This liquid was taken out of the glovebox, and diluted with hexanes, then slowly added to a cold water (100 ml) at 0° C. The mixture was stirred for ten minutes, then the top layer was separated, and further washed with sat. NaHCO$_3$ and water, dried over $MgSO_4$, and concentrated with a rotovap to give the crude product. Further purification was carried out under vacuum, at 90° C., to give the pure desired product as colorless clear liquid (5:1 endo/exo mixture). This procedure generally gives 77-80% yield.

Major isomer: $^1$H NMR (400 MHz, $CDCl_3$): 6.10 (dd, J=4 & 8 Hz, 1H), 5.90 (dd, J=4 & 8 Hz, 1H), 4.83 (m, 1H), 2.80 (br., 1H), 2.74 (br. 1H), 1.98 (m, 1H), 1.84 (m, 1H), 1.43-1.08 (m, 4H), 0.66-0.47 (m, 3H), 0.05 (s, 3H), 0.04 (s, 3H); $^{13}$C NMR (100 MHz, $CDCl_3$): 136.9, 132.2, 49.5, 45.0, 42.6, 42.0, 32.3, 29.2, 13.1, −4.5, −4.5; $^{29}$Si NMR (79 MHz, $CDCl_3$): −13.1 ppm. Minor isomer: $^1$H NMR (400 MHz, $CDCl_3$): 6.09 (dd, J=4 & 8 Hz, 1H), 6.02 (dd, J=4 & 8 Hz, 1H), 4.86 (m, 1H), 2.77 (br., 1H), 2.54 (br. 1H), 1.43-1.08 (m, 6H), 0.66-0.47 (m, 3H), 0.07 (s, 3H), 0.06 (s, 3H); $^{13}$C NMR (100 MHz, $CDCl_3$): 136.9, 136.2, 45.9, 45.1, 42.1, 41.8, 33.0, 31.0, 13.4, −4.4, −4.5; $^{29}$Si NMR (79 MHz, $CDCl_3$): −13.0 ppm.

Synthesis of 5-norbornen-2-yl(ethyl)tetramethyldisiloxane

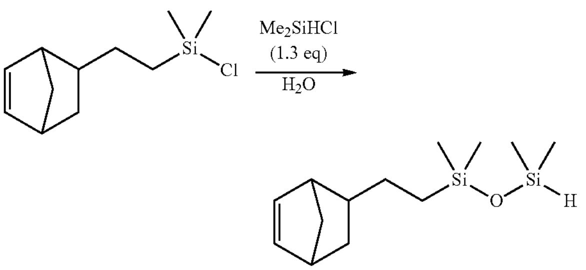

A 2 L, round bottom, three-neck flask was equipped with a magnetic stir bar, a water-cooled condenser, a thermometer, and a dropping funnel. The condenser was also connected to a bottle containing 30% of aq. NaOH solution. Deionized water (420 gram) was added to the flask, then the flask and contents were cooled with an ice-bath to <5° C. A mixture of 5-norbornen-2-yl(ethyl)chlorodimethylsilane (250 gram) and dimethylchlorosilane (143 gram, 1.3 equiv.) was added to the dropping funnel. The mixture was slowly added to the flask, while maintaining the internal temperature at <20° C. After addition, the ice-bath was removed, and the flask was stirred for 1.5 hours, and the temperature allowed to increase to room temperature. The organic phase (top layer) was washed with sat. aq. $NaHCO_3$ (200 mL×2) and deionized water (200 mL), and dried over $MgSO_4$. After filtration, the crude product was obtained as a colorless clear liquid (294 gram). The crude product was further purified by distillation, under high vacuum, at 120-130° C., to give the pure desired product as colorless clear liquid: 220 gram, 74% yield, a 5:1 mixture of endo/exo isomers.

Major isomer: $^1$H NMR (400 MHz, $CDCl_3$): 6.10 (dd, J=4 & 8 Hz, 1H), 5.90 (dd, J=4 & 8 Hz, 1H), 4.69 (m, 1H), 2.80 (br., 1H), 2.74 (br. 1H), 1.94 (m, 1H), 1.84 (m, 1H), 1.42-1.03 (m, 4H), 0.62-0.47 (m, 3H), 0.16 (s, 3H), 0.16 (s, 3H), 0.05 (s, 6H); $^{13}$C NMR (100 MHz, $CDCl_3$): 136.9, 132.2, 49.5, 45.0, 42.6, 42.1, 32.4, 28.0, 17.0, 0.9, −0.06, −0.09; $^{29}$Si NMR (79 MHz, $CDCl_3$): 9.8, −7.1 ppm. Minor isomer: $^1$H NMR (400 MHz, $CDCl_3$): 6.09 (dd, J=4 & 8 Hz, 1H), 6.02 (dd, J=4 & 8 Hz, 1H), 4.69 (m, 1H), 2.77 (br., 1H), 2.54 (br. 1H), 1.42-1.08 (m, 6H), 0.62-0.47 (m, 3H), 0.17 (s, 3H), 0.16 (s, 3H), 0.07 (s, 6H); $^{13}$C NMR (100 MHz, $CDCl_3$): 136.9, 136.2, 45.9, 45.1, 42.1, 41.8, 33.0, 29.8, 17.4, 0.9, −0.02, −0.06; $^{29}$Si NMR (79 MHz, $CDCl_3$): 9.7, −7.0 ppm.

Synthesis of 2-(bicyclo[2.2.]]hept-5-en-2-yl)ethyl) diethylsilane

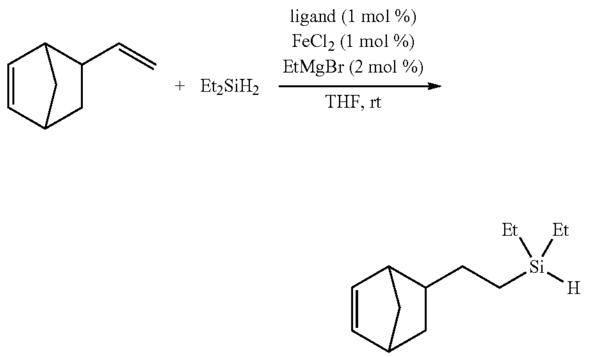

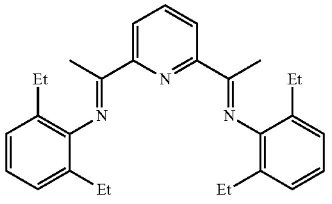

ligand

To a 250 mL, round bottomed flask, was added THF (200 mL), 5-vinylbicyclo[2.2.1]-hept-2-ene (5.0 g, 42 mmol), $FeCl_2$ (53 mg, 0.42 mmol), and (1E,1'E)-1,1'-(pyridine-2,6-diyl)bis(N-(2,6-diethylphenyl)ethan-1-imine) (177 mg, 0.42 mmol). The EtMgBr (0.28 mL, 3.0 M solution in THF, 0.84 mmol) was slowly added dropwise, which caused the immediate formation of a dark brown solution. The diethylsilane (4.0 g, 45.8 mmol) was added dropwise to the stirred solution, and the mixture was stirred overnight at room temperature. After which time, the solvents were removed by rotary evaporation, and the residue was dissolved in hexane (100 mL). The hexane solution was passed through a pad of silica, and the solvent was removed to yield the product. Distillation of the colorless residue at 250° C. yielded the product (7.4 g), as a clear colorless liquid, in 85% yield. The product was a 4:1 mixture of exo/endo isomers.

Major isomer: $^1$H NMR (400 MHz, $CDCl_3$): 6.10 (dd, J=4 & 8 Hz, 1H), 5.90 (dd, J=4 & 8 Hz, 1H), 3.60 (sept, J=8 Hz, 1H), 2.80 (br s, 1H), 2.74 (br s, 1H), 1.95 (m, 1H), 1.83 (m, 1H), 1.43-1.08 (m, 4H), 0.96 (t, J=8 Hz, 6H), 0.66-0.47 (m, 3H), 0.57 (m, 4H). $^{13}$C NMR (100 MHz, $CDCl_3$): 137.0, 132.3, 49.5, 45.0, 42.6, 42.2, 32.4, 29.4, 9.47, 8.22, 8.20, 2.79, 2.75. Minor isomer: $^1$H NMR (400 MHz, $CDCl_3$): 6.08 (dd, J=4 & 8 Hz, 1H), 6.02 (dd, J=4 & 8 Hz, 1H), 3.63 (sept., J=8 Hz, 1H), 2.77 (br s, 1H), 2.54 (br s, 1H), 1.43-1.08 (m, 6H), 0.98 (t, J=8 Hz, 6H), 0.66-0.47 (m, 3H), 0.57 (m, 4H). $^{13}$C NMR (100 MHz, $CDCl_3$): 136.9, 136.3, 46.0, 45.1, 42.3, 41.8, 33.0, 31.3, 9.79, 8.20, 2.81.

Synthesis of (2-(bicyclo[2.2.]]hept-5-en-2-yl)ethyl) diphenylsilane

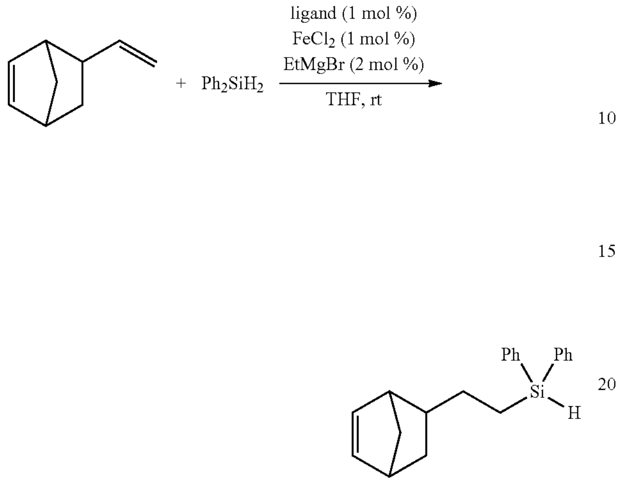

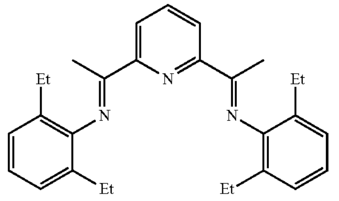

ligand

To a 250 mL, round bottomed flask, was added THF (200 mL), 5-vinylbicyclo[2.2.1]-hept-2-ene (5.0 g, 42 mmol), $FeCl_2$ (53 mg, 0.42 mmol), and (1E,1'E)-1,1'-(pyridine-2,6-diyl)bis(N-(2,6-diethylphenyl)ethan-1-imine) (177 mg, 0.42 mmol). The EtMgBr (0.28 mL, 3.0 M solution in THF, 0.84 mmol) was slowly added dropwise, which caused the immediate formation of a dark brown solution. Diphenylsilane (4.0 g, 45.8 mmol) was added dropwise to this stirred solution, and the mixture was stirred overnight at room temperature. After which time, the solvents were removed by rotary evaporation, and the residue dissolved in hexane (100 mL). The hexane solution was passed through a pad of silica, and the solvent removed to yield the product (9.5 g) as a clear colorless liquid, in 75% yield. The product was a 4:1 mixture of exo/endo isomers.

Major isomer: $^1$H NMR (400 MHz, $CDCl_3$): 7.56-7.52 (m, 2H), 7.39-7.33 (m, 3H), 6.07 (dd, J=4 & 8 Hz, 1H), 5.85 (dd, J=4 & 8 Hz, 1H), 4.81 (t, J=8 Hz, 1H), 2.81 (br s, 1H), 2.72 (br s, 1H), 2.01 (m, 1H), 1.81 (m, 1H), 1.40-1.05 (m, 6H), 0.45 (m 1H). $^{13}$C NMR (100 MHz, $CDCl_3$): 137.1, 135.1, 135.0, 132.2, 129.5, 128.0, 49.5, 45.0, 42.6, 42.1, 32.3, 29.2, 11.2. Minor isomer: $^1$H NMR (400 MHz, $CDCl_3$): 7.56-7.52 (m, 2H), 7.39-7.33 (m, 3H), 6.05 (dd, J=4 & 8 Hz, 1H), 6.01 (dd, J=4 & 8 Hz, 1H), 4.84 (t, J=8 Hz, 1H), 2.75 (br s, 1H), 2.53 (br s, 1H), 1.53 (m, 2H), 1.40-1.05 (m, 7H). $^{13}$C NMR (100 MHz, $CDCl_3$): 136.9, 136.3, 135.1, 135.0, 129.5, 128.0, 45.9, 45.1, 42.2, 41.9, 33.0, 31.0, 11.5.

Synthesis of ethylene-co-1-octene-co-1-(5-norbornen-2-yl(ethyl))-1,1-dimethylsilane terpolymers Batch reactor polymerizations were conducted in a "2 L PARR" batch reactor. The reactor was heated by an electrical heating mantle, and cooled by an internal serpentine cooling coil containing cooling water. Both the reactor and the heating/cooling system were controlled and monitored by a process computer. The bottom of the reactor was fitted with a dump valve, which emptied the reactor contents into a stainless steel dump pot, which was prefilled with a catalyst kill solution (typically 5 mL of a IRGAFOS/IRGANOX/toluene mixture). The dump pot was vented to a 30 gallon blow-down tank, with both the pot and the tank purged with nitrogen. The polymerization solvents, the monomers, and the catalyst makeup were run through purification columns to remove any impurities that may affect polymerization. The $N_2$, used for transfers, was also passed through a purification column. The reactor was loaded first from a shot tank that may contain ISOPAR-E solvent and/or 1-octene, depending on desired reactor load. The shot tank was filled to the load set points. The desired amount of silane or siloxane monomer was added via the shot tank. After the liquid feed addition, the reactor was heated up to the polymerization temperature set point. If ethylene was used, it was added to the reactor, when at reaction temperature, to maintain reaction pressure set point. Ethylene addition amounts were monitored by a flow meter.

The procatalyst and activators were mixed with the appropriate amount of purified toluene to achieve a desired molarity solution. The catalyst and activators were handled in an inert glove box, drawn into a syringe, and pressure transferred into a catalyst shot tank. This was followed by three rinses of toluene, 5 mL each. Immediately after the catalyst addition, the run timer began. If ethylene was used, it was then added by the process computer to maintain reaction pressure set point in the reactor. These polymerizations were run for ten minutes, then the agitator was stopped, and the bottom dump valve opened to empty reactor contents to the dump pot. The dump pot contents were poured into trays, which were placed in a lab hood, where the solvent was evaporated overnight. The trays containing the remaining polymer were then transferred to a vacuum oven, where they were heated to 140° C., under vacuum, to remove any remaining solvent. After the trays cooled to ambient temperature, the polymers were weighed for yield/efficiencies, and submitted for polymer characterization.

Figure 3:
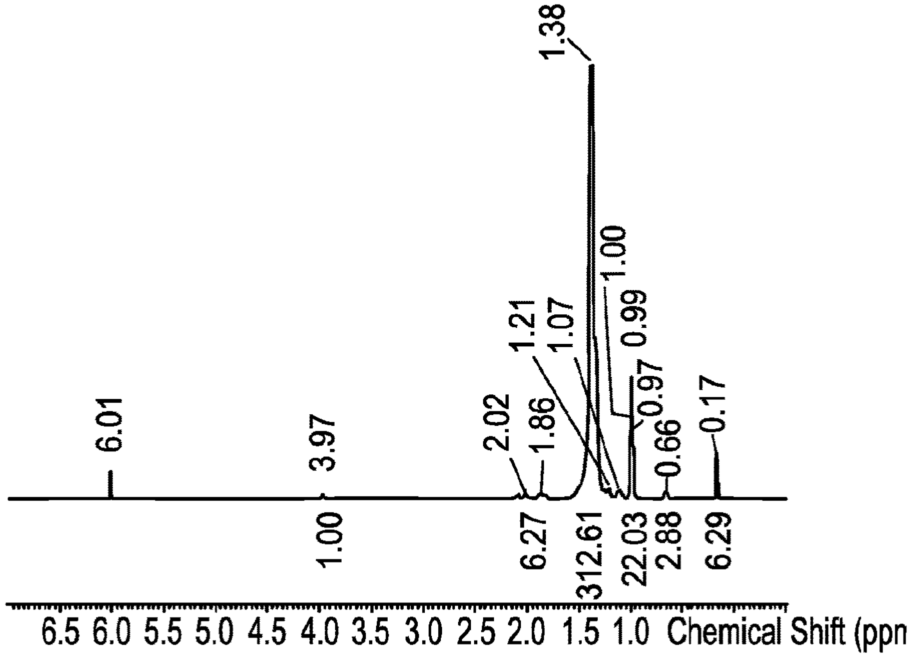
FIG. 3 depicts the 1H NMR of an ethylene-co-1-octene-co-1-(5-norbornen-2-yl(ethyl))-1,1-dimethylsilane terpolymer (Ex. 11).

Polymer examples were prepared following the batch reactor process using the conditions shown in Table 5. The amount of procatalyst used was adjusted to reach a desired efficiency. The reactor pressure and temperature were kept constant, by feeding ethylene during the polymerization, and cooling the reactor as needed. All reactions were run for ten minutes. All polymerizations were performed with bis(hydrogenated tallow alkyl)methylammonium tetrakis(pentafluoro-phenyl)borate as the activator and MMAO as the scavenger. Polymer properties are shown in Table 6. See also FIG. 3 (IH NMR profile of Ex. 11 (terpolymer)).

TABLE 5

| Polymerization Conditions | | | | | | | | | | | | | |
|---|---|---|---|---|---|---|---|---|---|---|---|---|---|
| Ex. | Cat. | Catalyst Loading μmol | Silane Monomer | Silane Added mL | Efficiency g polymer/ g catalyst | Reaction Temp. Deg C. | Reactor Pressure psig | ISOPAR E g | C8* g | Hydrogen mmol | Activator μmol | Scavenger μmol |
| C4 | CAT A | 2.5 | — | 0 | 292459 | 120 | 113.8 | 1135.7 | 11.52 | 20.1 | 3 | 25 |
| C5 | CAT A | 2.5 | — | 0 | 267391 | 120 | 108.8 | 1151.7 | 5.76 | 20 | 3 | 25 |
| 9 | CAT A | 2.5 | Nor-SiMe2H | 8 | 267391 | 120 | 111.6 | 1134.9 | | 20.1 | 3 | 25 |
| 10 | CAT A | 2.5 | Nor-SiMe2H | 4 | 250679 | 120 | 113.8 | 1130.5 | | 20.1 | 3.0 | 25 |
| C6 | CAT B | 0.75 | — | 0 | 779890 | 120 | 113.7 | 1139 | 11.52 | 20 | 0.9 | 7.5 |
| C7 | CAT B | 0.75 | — | 0 | 668477 | 120 | 113.8 | 1129.1 | 5.76 | 20.1 | 0.9 | 7.5 |
| 11 | CAT B | 1.0 | Nor-SiMe2H | 8 | 689367 | 120 | 113.7 | 1130.6 | | 20.1 | 1.2 | 10 |
| 12 | CAT B | 1.0 | Nor-SiMe2H | 4 | 940046 | 120 | 114.1 | 1131.8 | | 20 | 1.2 | 10 |

*C8 = 1-octene

TABLE 6

| Interpolymer Properties | | | | | | | | |
|---|---|---|---|---|---|---|---|---|
| Ex. | Tm1 | Tm2 | Mn | Mw | Mw/Mn | C8 1H NMR* | 1H NMR* (Incorporation of siloxane monomer) | |
| — | Deg C. | Deg C. | g/mol | g/mol | — | mol % | mol % | wt % |
| C4 | 112.3 | 116.5 | 4103 | 12248 | 2.98 | 5.90 | 0 | 0 |
| C5 | 118.0 | 120.7 | 6974 | 15744 | 2.26 | 2.61 | 0 | 0 |
| 9 | 120.3 | — | 6066 | 12923 | 2.13 | 1.37 | 1.04 | 5.8 |
| 10 | 125.7 | — | 6463 | 14979 | 2.32 | 0.97 | 0.42 | 2.4 |
| C6 | 106.0 | — | 21824 | 51891 | 2.38 | | 0 | 0 |
| C7 | 111.6 | — | 45287 | 110285 | 2.44 | 2.59 | 0 | 0 |
| 11 | 121.5 | — | 5550 | 12100 | 2.18 | 1.00 | 1.48 | 8.1 |
| 12 | 121.5 | — | 10811 | 48878 | 4.52 | 0.54 | 0.37 | 2.2 |

*Incorporation measured by 1H NMR spectroscopy: mol % based on total moles of polymerized monomers in the terpolymer; wt % based on weight of the terpolymer.

Functionalization of ethylene-co-1-octene-co-1(5-norbornen-2-yl(ethyl))-1,1-dimethylsilane terpolymers Scheme

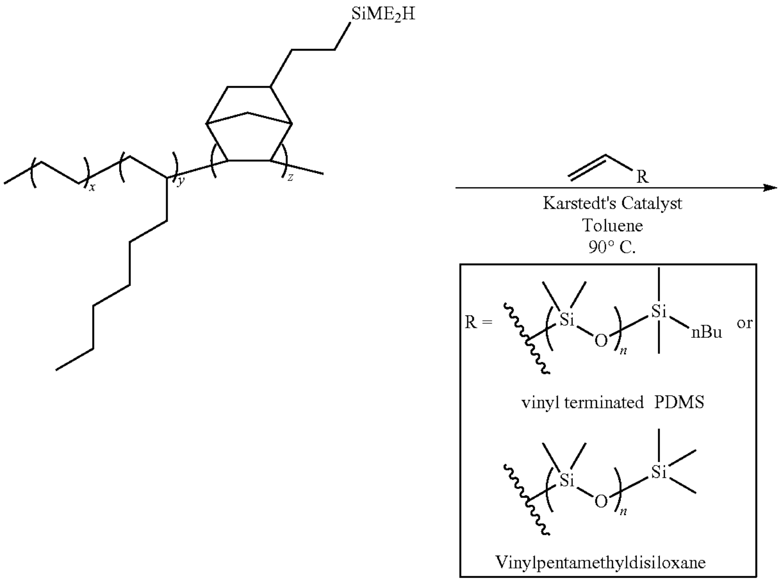

-continued

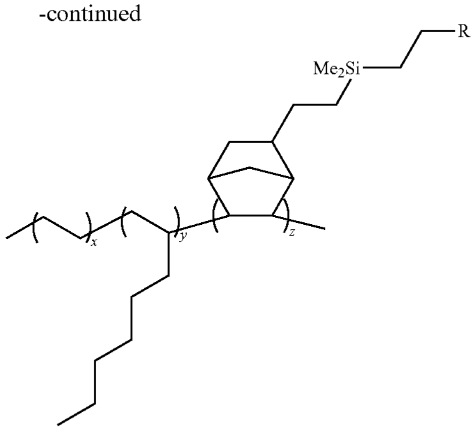

Study 1:

In a dry/N2 glove box, 2 dram vial, with a PTFE stir bar, was charged with 200 mg of SiH-Terpolymer ($M_n$=6066, ~2 SiH/chain, Ex. 9) and 419 mg of vinyl-terminated PDMS (available from Gelest, MW=5500-6500) and 4 mL of toluene. The solution was heated, and stirred at 100° C., until homogenous, and then cooled to 90° C. Next, the Karstedt's catalyst was added, as a 0.2 wt % stock solution, to bring the concentration to approx. 20 ppm Pt. The reaction was stirred for two hours, and then removed from the glove box, precipitated into a rapidly stirred mixture of isopropanol and methanol (1:1 v/v), isolated by filtration, and dried under vacuum, at 60° C., overnight, to yield 417 mg of the graft (or functionalized) polymer.

Figure 4:
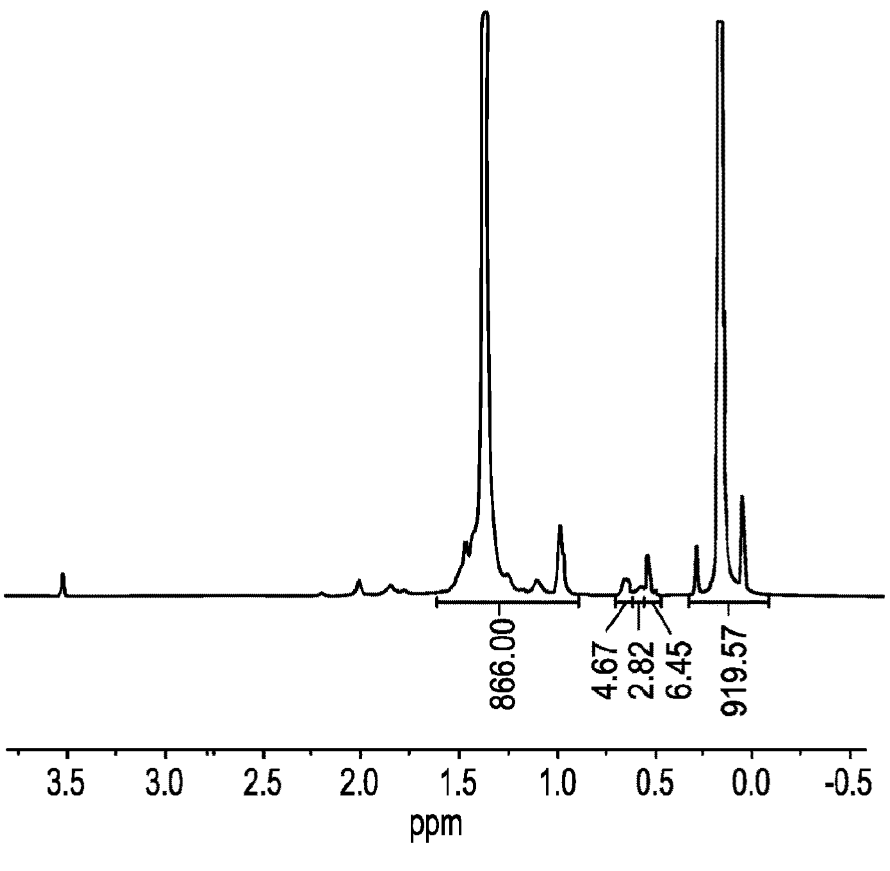
FIG. 4 depicts the 1H NMR of an ethylene-co-1-octene-co-1-(5-norbornen-2-yl(ethyl))-1,1-dimethylsilane terpolymer after functionalization with vinyl-terminated PDMS.
Figure 5:
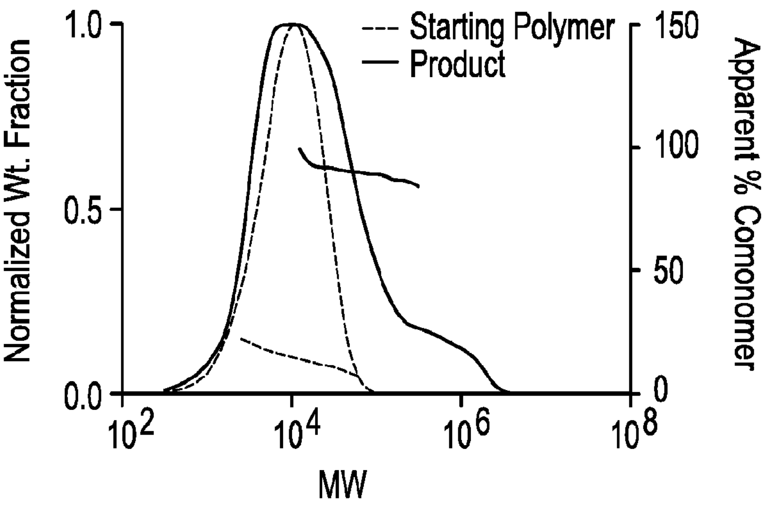
FIG. 5 depicts GPC profiles of an ethylene-co-1-octene-co-1-(5-norbornen-2-yl(ethyl))-1,1-dimethylsilane terpolymer, before, and after, functionalization with vinyl-terminated PDMS. Note, the broader GPC profile is "Product," and the upper "apparent % comonomer" curve is "Product."

Analysis was performed by $^1$H NMR (tetrachloroethane-$d_2$, 110° C.), and the conversion was determined by normalizing to the number of aliphatic protons, dictated by the $M_n$ (approx. 866 aliphatic protons). The Si—H groups were completely consumed, as evidenced by the absence of a resonance at 3.95 ppm. The emergence of a peak at 0.5 ppm, corresponding to the —SiMe2-CH2CH2-SiMe2- bridge, formed as a product of hydrosilylation, integrated to 6.45 protons, indicating there were 1.6 grafts per chain, approximately 80% conversion. The GPC trace indicated an increase in molecular weight of the product, along with the presence of some high molecular weight species, indicating partial crosslinking. The "apparent % comonomer" was seen to significantly increase in the product, indicating successful grafting. See FIGS. 4 and 5.

Study 2:

In a glove box, a 2 dram vial, with a PTFE stir bar, was charged with 200 mg of SiH-Terpolymer ($M_n$=6066, ~2 SiH/chain, Ex. 9) and 34 mg of vinylpentamethyldisiloxane and 3 mL of toluene. The solution was heated and stirred at 100° C., until homogenous, and then cooled to 90° C. Next, the Karstedt's catalyst was added, as a 0.2 wt % stock solution, to bring the concentration to approx. 20 ppm Pt. The reaction was stirred for two hours, then removed from the glove box, precipitated into a rapidly stirred mixture of isopropanol and methanol (1:1 v/v), isolated by filtration, and dried under vacuum, at 60° C., overnight, to yield 163 mg of the graft polymer.

Figure 6:
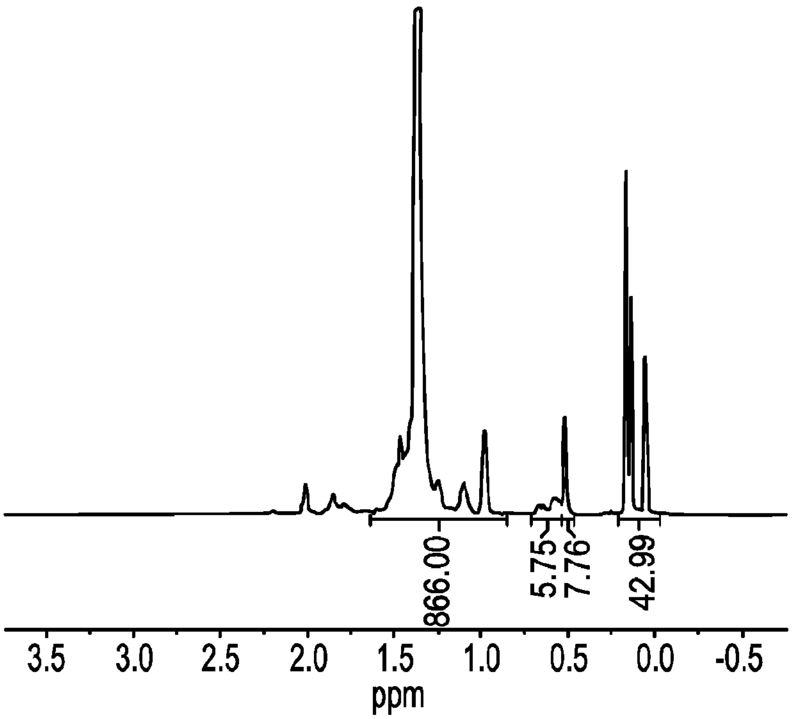
FIG. 6 depicts the 1H NMR spectrum of an ethylene-co-1-octene-co-1-(5-norbornen-2-yl(ethyl))-1,1-dimethylsilane terpolymer after functionalization with vinylpentamethyldisiloxane.
Figure 7:
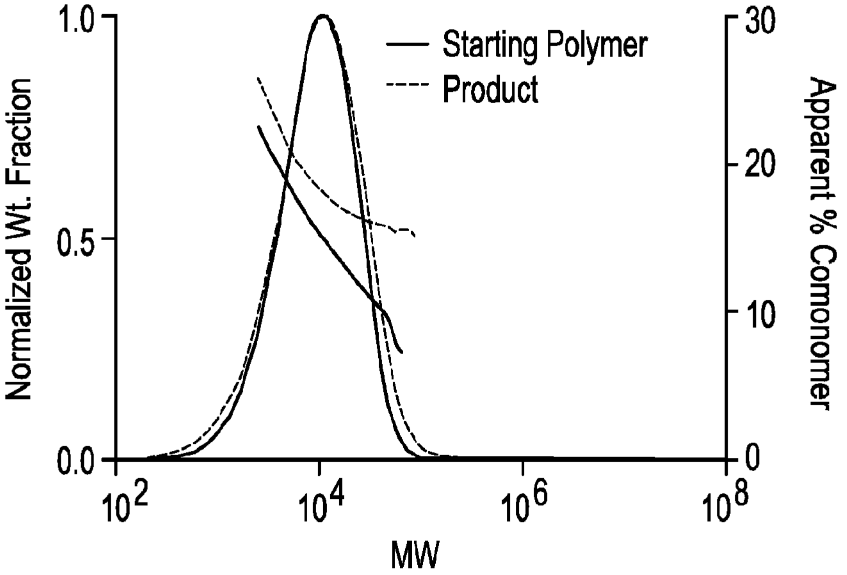
FIG. 7 depicts GPC profiles of an ethylene-co-1-octene-co-1-(5-norbornen-2-yl(ethyl))-1,1-dimethylsilane terpolymer, before, and after, functionalization with vinylpentamethyldisiloxane. Note, the slighter broader GPC profile is "Product," and the upper "apparent % comonomer" curve is "Product."

Analysis was performed by $^1$H NMR (tetrachloroethane-$d_2$, 110° C.), and the conversion was determined by normalizing to the number of aliphatic protons, dictated by the M. (approx. 866 aliphatic protons). The Si—H groups were completely consumed, as evidenced by the absence of a resonance at 3.95 ppm. The emergence of a peak at 0.5 ppm, corresponding to the —SiMe2-CH2CH2-SiMe2- bridge, formed as a product of hydrosilylation, integrated to 7.76 protons, indicating there were 1.94 grafts per chain, approximately 97% conversion. The GPC trace indicated an increase in molecular weight of the product. The "apparent % comonomer" was seen to increase in the product, indicating successful grafting. See FIGS. 6 and 7.

Study 3:

In a dry/N2 glove box, a 2 dram vial, with a PTFE stir bar, was charged with 200 mg of SiH-Terpolymer (Mn=6463, ~1 SiH/chain, Ex. 10) and 174 mg of vinyl-terminated PDMS and 3 mL of toluene. The solution was heated, and stirred at 100° C., until homogenous, and then cooled to 90° C. Next, the Karstedt's catalyst was added, as a 0.2 wt % stock solution, to bring the concentration to approx. 20 ppm Pt. The reaction was stirred for two hours, then removed from the glove box, precipitated into a rapidly stirred mixture of isopropanol and methanol (1:1 v/v), isolated by filtration, and dried under vacuum, at 60° C., overnight, to yield 215 mg of the graft polymer (extensive crosslinking apparent).

Figure 8:
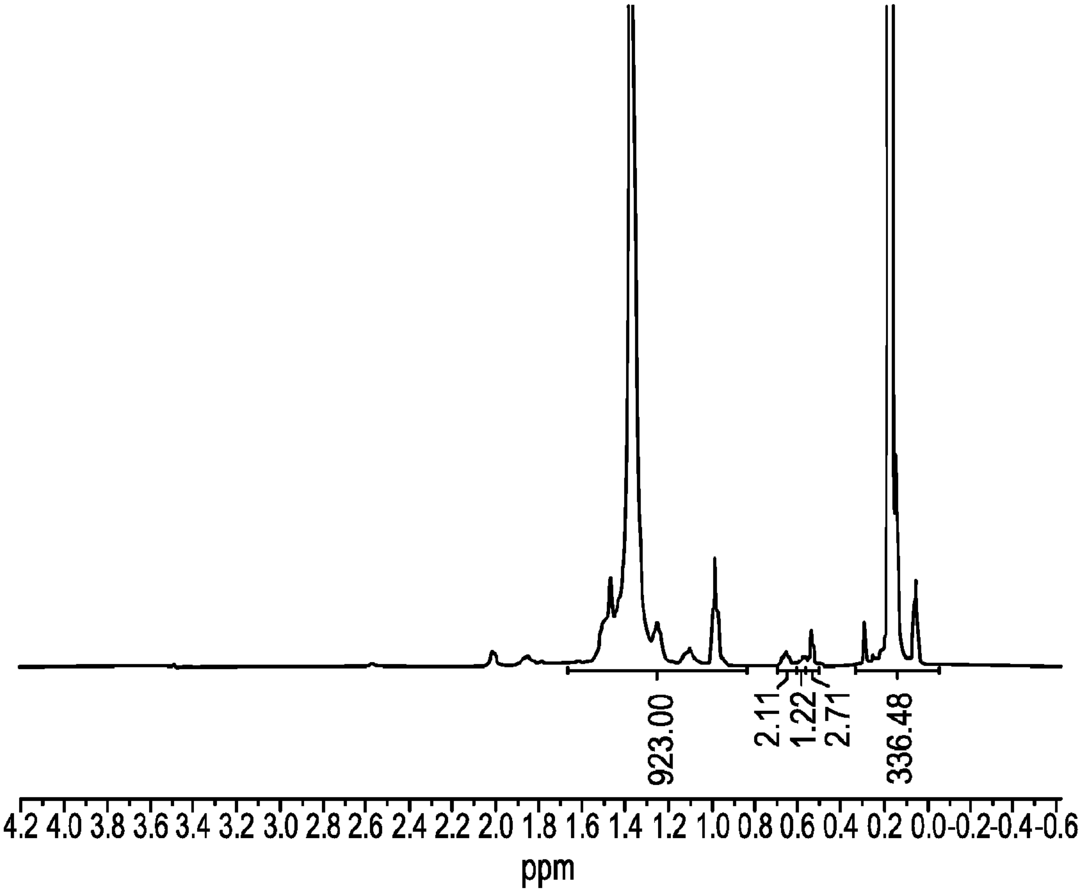
FIG. 8 depicts the 1H NMR spectrum of an ethylene-co-1-octene-co-1-(5-norbornen-2-yl(ethyl))-1,1-dimethylsilane terpolymer after functionalization with vinyl-terminated PDMS.

Analysis was performed by $^1$H NMR (tetrachloroethane-$d_2$, 110° C.), and the conversion was determined by normalizing to the number of aliphatic protons dictated by the M. (approx. 923 aliphatic protons). The Si—H groups were completely consumed, as evidenced by the absence of a resonance at 3.95 ppm. The emergence of a peak at 0.5 ppm, corresponding to the —SiMe2-CH2CH2-SiMe2- bridge, formed as a product of hydrosilylation, integrated to 2.71 protons, indicating there were 0.67 grafts per chain, approximately 67% conversion. See FIG. 8.

Study 4:

In a dry/N2 glove box, a 2 dram vial, with a PTFE stir bar, was charged with 200 mg of SiH-Terpolymer ($M_n$=6463, ~1 SiH/chain, Ex. 10) and 14 mg of vinylpentamethyl-disiloxane and 3 mL of toluene. The solution was heated, and stirred at 100° C., until homogenous, and then cooled to 90° C. Next, the Karstedt's catalyst was added, as a 0.2 wt % stock solution, to bring the concentration to approx. 20 ppm Pt. The reaction was stirred for two hours, then removed from the glove box, precipitated into a rapidly stirred mixture of isopropanol and methanol (1:1 v/v), isolated by filtration, and dried under vacuum, at 60° C., overnight, to yield 143 mg of the graft polymer.

Figure 9:
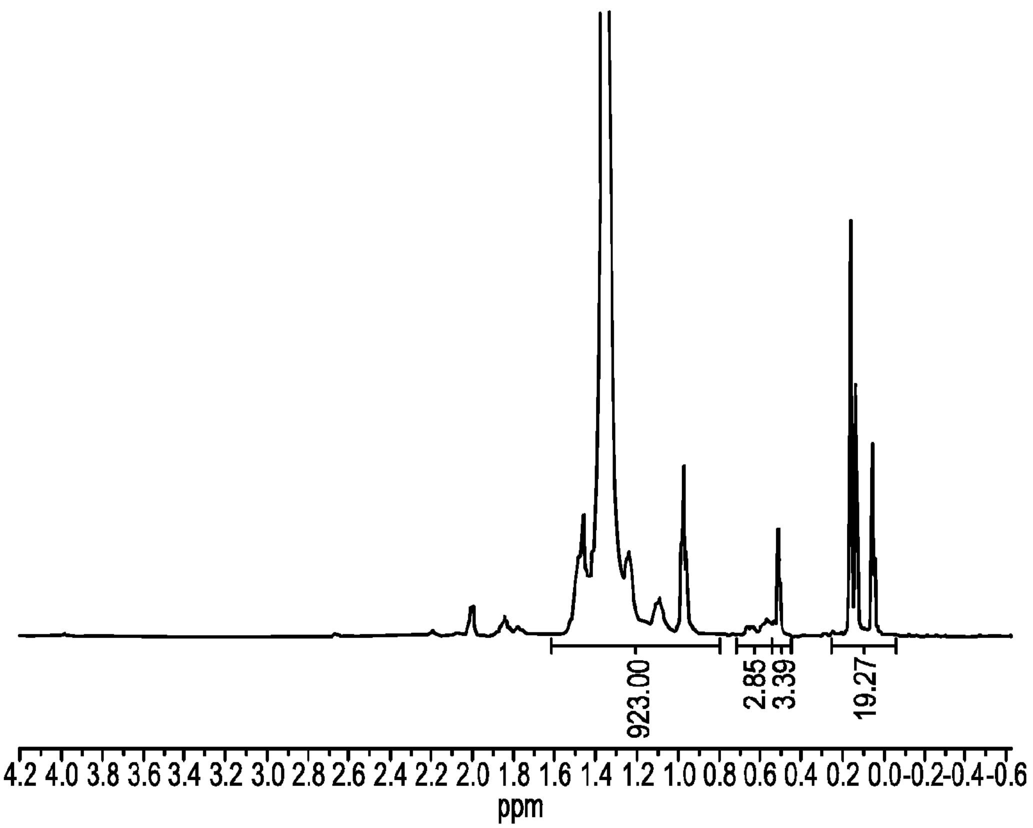
FIG. 9 depicts the 1H NMR of an ethylene-co-1-octene-co-1-(5-norbornen-2-yl(ethyl))-1,1-dimethylsilane terpolymer after functionalization with vinylpentamethyl-disiloxane.
Figure 10:
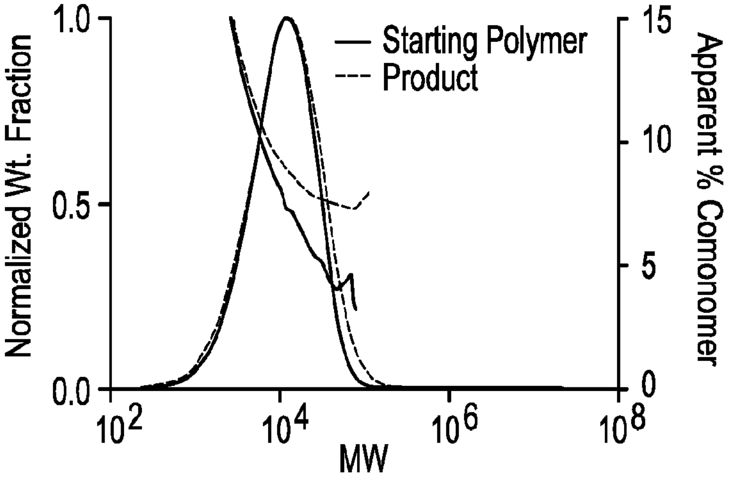
FIG. 10 depicts GPC profiles of an ethylene-co-1-octene-co-1-(5-norbornen-2-yl(ethyl))-1,1-dimethylsilane terpolymer, before, and after, functionalization with vinylpentamethyldisiloxane. Note, the slighter broader GPC profile is "Product," and the upper "apparent % comonomer" curve is "Product."

Analysis was performed by $^1$H NMR (tetrachloroethane-$d_2$, 110° C.), and the conversion was determined by normalizing to the number of aliphatic protons, dictated by the $M_n$ (approx. 923 aliphatic protons). The Si—H groups were completely consumed, as evidenced by the absence of a resonance at 3.95 ppm. The emergence of a peak at 0.5 ppm, corresponding to the —SiMe2-CH2CH2-SiMe2- bridge, formed as a product of hydrosilylation, integrated to 3.39 protons, indicating there were 0.85 grafts per chain, approximately 85% conversion. The GPC trace indicated an increase in molecular weight of the product. The "apparent % comonomer" was seen to increase in the product, indicating successful grafting. See FIGS. 9 and 10.

What is claimed is:

1. An interpolymer, which comprises at least one siloxane group, said interpolymer prepared by polymerizing a mixture comprising one or more "addition polymerizable monomers" and at least one siloxane monomer, in the presence of a catalyst system comprising a Group 3-10 metal complex, and wherein the siloxane monomer is selected from the following Formula 1:

$$A_a\text{-Si}(B_b)(C_c)(H_{h0})\text{—O—}(\text{Si}(D_d)(E_e)(H_{h1})\text{—O})_x\text{—Si}(F_f)(G_g)(H_{h2}) \quad \text{(Formula 1)},$$

where A is an alkenyl group, H is hydrogen;

B is a hydrocarbyl group, C is a hydrocarbyl group, and B and C may be the same or different;

a=1 or 2, b=0, 1 or 2, c=0, 1 or 2, h0=0, 1 or 2, a+b+c+h0=3;

D is a hydrocarbyl group, E is a hydrocarbyl group, and D and E may be the same or different, and where D may be the same or different across the number of x units, and where E may be the same or different across the number of x units;

d=0, 1 or 2, e=0, 1 or 2, h1=0, 1 or 2, d+e+h1=2, x≥0;

F is a hydrocarbyl group, G is a hydrocarbyl group, and F and G may be the same or different;

f=0, 1 or 2, g=0, 1 or 2, h2=1 or 2, f+g+h2=3; and wherein the one or more "addition polymerizable monomers" comprise ethylene and an alpha-olefin; and where the interpolymer comprises, in polymerized form, ≥50 wt % ethylene, based on the weight of the interpolymer; and where the alpha-olefin is propylene, 1-butene, 1-hexene or 1-octene; and wherein the interpolymer is an ethylene/alpha-olefin/siloxane interpolymer that has a MWD≤4.00.

2. The interpolymer of claim 1, wherein, for Formula 1, A is selected from the following structures i)-iv):

i) $R^1R^2C{=}CR^3$—, where each of $R^1$, $R^2$, $R^3$ is independently hydrogen, an alkyl group, or an aryl group, and wherein two or more from $R^1$, $R^2$, $R^3$ may be the same or different;

ii) $R^1R^2C{=}CR^3$—$(CR^4R^5)n$-, where each of $R^1$, $R^2$, $R^3$, $R^4$, $R^5$ is independently hydrogen, an alkyl group, or an aryl group, and wherein two or more from $R^1$, $R^2$, $R^3$, $R^4$, $R^5$ may be the same or different, and n≥1;

iii)

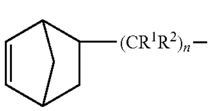

, where each of $R^1$ and $R^2$ is independently hydrogen, an alkyl group, or an aryl group, and wherein $R^1$, and $R^2$ may be the same or different, and n≥1; or iv)

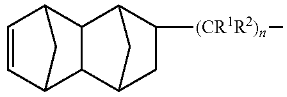

, where each of $R^1$ and $R^2$ is independently hydrogen, an alkyl group, or an aryl group, and wherein $R^1$, and $R^2$ may be the same or different, and n≥1.

3. The interpolymer of claim 1, wherein Formula 1 is selected from the following compounds s1) through s8) below:

(s1)

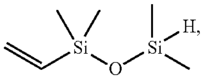

(s2)

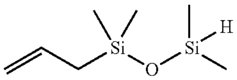

(s3)

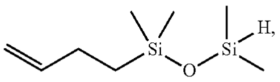

(s4)

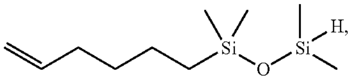

(s5)

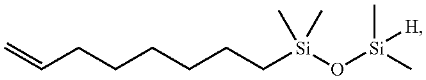

(s6)

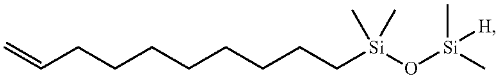

(s7)

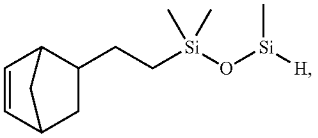

or (s8)

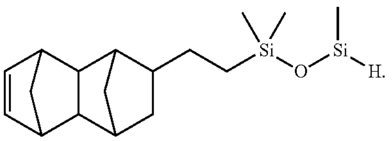

4. A derivative of the interpolymer any one of claim 1, wherein the derivative is formed by one or more subsequent siloxane conversion processes selected from the group consisting of a)-e) below:

a) coupling of one or more chains of the interpolymer;

b) hydrolysis, alcoholysis, oxidation, or aminolysis to give Si—$OR^4$ or Si—$NR^4_2$ groups, where $R^4$ is H or a $C_1$-$C_{10}$ hydrocarbyl;

c) hydrolysis and neutralization to give ionomers having Si—$OR^6$ groups, where $R^6$ is a metal cation;

d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups; and e) modification through hydrosilylation or a Piers Rubinsztajn reaction.

5. A composition comprising the interpolymer of claim 1, and at least one additive.

6. An article comprising at least one component formed from the composition of claim 5.

7. The interpolymer of claim 1, wherein the interpolymer has a molecular weight distribution (MWD)≤3.00, a density ≤0.884 g/cc, and a melting temperature (Tm) ≤90° C.

8. The interpolymer of claim 1, wherein the interpolymer is an ethylene/alpha-olefin/siloxane terpolymer.

9. The interpolymer of claim 1, wherein the interpolymer comprises, in polymerized form, ≥7.0 mol % of the alpha-olefin, based on the total moles of polymerized monomers in the interpolymer.

10. The interpolymer of claim 1, wherein the interpolymer has a MWD≤3.50.

11. The interpolymer of claim 10, wherein the interpolymer has a MWD≤3.00.

12. The interpolymer of claim 8, wherein the terpolymer comprises, in polymerized form, ≥7.0 mol % of the alpha-olefin, based on the total moles of polymerized monomers in the terpolymer.

13. The interpolymer of claim 8, wherein the interpolymer has a MWD≤3.50.

* * * * *